(12) United States Patent
Schindler et al.

(10) Patent No.: US 11,920,918 B2
(45) Date of Patent: Mar. 5, 2024

(54) ONE SHOT CALIBRATION

(71) Applicant: TRINAMIX GMBH, Ludwighshafen am Rhein (DE)

(72) Inventors: Patrick Schindler, Ludwigshafen am Rhein (DE); Christian Bonsignore, Ludwigshafen am Rhein (DE); Benjamin Rein, Weinheim (DE); Ruben Huehnerbein, Ludwigshafen am Rhein (DE)

(73) Assignee: TRINAMIX GMBH, Ludwigshafen am Rhein (DE)

( * ) Notice: Subject to any disclaimer, the term of this patent is extended or adjusted under 35 U.S.C. 154(b) by 0 days.

(21) Appl. No.: 18/363,474

(22) Filed: Aug. 1, 2023

(65) Prior Publication Data

US 2024/0011770 A1    Jan. 11, 2024

Related U.S. Application Data

(63) Continuation of application No. PCT/EP2022/083146, filed on Nov. 24, 2022.

(51) Int. Cl.
| | |
|---|---|
| *H04N 23/56* | (2023.01) |
| *G01B 11/25* | (2006.01) |
| *G03B 21/20* | (2006.01) |
| *G06T 7/80* | (2017.01) |

(52) U.S. Cl.
CPC ........ *G01B 11/2504* (2013.01); *G03B 21/208* (2013.01); *G06T 7/80* (2017.01); *H04N 23/56* (2023.01); *G03B 21/2013* (2013.01)

(58) Field of Classification Search
CPC ...... G01B 11/2504; G06T 7/80; H04N 23/56; G03B 21/208; G03B 21/2013

USPC ......................................................... 348/187
See application file for complete search history.

(56) References Cited

U.S. PATENT DOCUMENTS

| | | | | |
|---|---|---|---|---|
| 8,282,222 | B2 * | 10/2012 | Smits .................... | H04N 9/3194 |
| | | | | 353/85 |
| 10,564,266 | B2 * | 2/2020 | O'Keeffe .............. | G01S 17/931 |
| 11,143,736 | B2 * | 10/2021 | Schindler ................ | G01S 3/784 |
| 11,372,320 | B2 * | 6/2022 | Smits .................... | H04N 9/3185 |

(Continued)

OTHER PUBLICATIONS

International Search Report and Written Opinion for corresponding PCT/EP22/83146, dated Mar. 9, 2023, 12 pages.

(Continued)

*Primary Examiner* — Trang U Tran
(74) *Attorney, Agent, or Firm* — Armstrong Teasdale LLP

(57) ABSTRACT

Described herein is a method for calibrating a detector including at least one camera and at least one projector. The projector is configured for illuminating at least one target with at least one predefined illumination pattern including a plurality of illumination features. The camera has at least one sensor element having a matrix of optical sensors, the optical sensors each having a light-sensitive area, where each optical sensor is designed to generate at least one sensor signal in response to an illumination of its respective light-sensitive area by a light beam propagating from the target to the camera. The target includes at least one first target and at least one second target. The first target and the second target have a predefined fixed relative distance. The target is positioned at a pre-defined distance from the detector.

27 Claims, 4 Drawing Sheets

(56) References Cited

U.S. PATENT DOCUMENTS

| | | | | |
|---|---|---|---|---|
| 11,531,257 B2* | 12/2022 | Smits | ................... | G03B 21/147 |
| 2017/0178354 A1 | 6/2017 | Wendler | | |
| 2018/0249142 A1* | 8/2018 | Hicks | ................... | H04N 13/239 |
| 2019/0147241 A1* | 5/2019 | Shudo | ................... | A61B 3/152 |
| | | | | 348/78 |
| 2019/0304121 A1* | 10/2019 | Wang | ........................ | G06T 7/85 |
| 2020/0371237 A1* | 11/2020 | Schindler | .............. | G01S 7/4802 |

OTHER PUBLICATIONS

Orghidan et al., Structured Light Self-Calibration with Vanishing Points, Machine Vision and Applications, Jun. 2013, 25(2), 12 pages.

* cited by examiner

ONE SHOT CALIBRATION

CROSS-REFERENCE TO RELATED APPLICATIONS

This application is a bypass U.S. Continuation Application of International Patent Application No. PCT/EP22/83146, filed Nov. 24, 2022, which claims priority to European Patent Application No. 21210477.2, filed Nov. 25, 2021, each of which is hereby incorporated by reference herein.

FIELD OF THE INVENTION

The invention relates to a method for calibrating a detector, a method for determining a position of at least one object and a detector for determining a position of at least one object and a mobile device. The invention further relates to various uses of the detector. The devices, methods and uses according to the present invention specifically may be employed for example in various areas of daily life, gaming, traffic technology, production technology, security technology, photography such as digital photography or video photography for arts, documentation or technical purposes, medical technology or in the sciences. Further, the invention specifically may be used for scanning one or more objects and/or for scanning a scenery, such as for generating a depth profile of an object or of a scenery, e.g. in the field of architecture, metrology, archaeology, arts, medicine, engineering or manufacturing. However, other applications are also possible.

PRIOR ART

A 3D sensor such as an active triangulation system typically comprises at least one camera and at least one light projector, e.g. structured light systems. Other triangulation systems like stereo cameras may comprise at least of two cameras. For a proper three dimensional reconstruction by triangulation the knowledge about the position and rotation of the components like camera and projector are essential. Additionally, the three dimensional reconstruction by triangulation requires also a solved correspondence of important points on the scene, e.g. laser spots, light spots of the projector or detected edges captured by the camera. A three dimensional position can be computed by the known translation and a relative rotation of the camera to the projector. This parameter defines the extrinsic calibration of a triangulation system. Thus, the quality of the three dimensional measurement results depends on the extrinsic calibration. Depending on the hardware, already calibrated systems can be degenerated by physical stress or temperature shifts, i.e. relative position and rotation changes in time. This may yield to false measurement results. Obviously, the system can be repaired by an additional re-calibration process. Depending on the application this may also be time consuming and not practical.

Concepts for recalibration algorithms already exists, e.g. E. Rehder et al., "Online Stereo Camera Calibration From Scratch", June 2017, Conference: 2017 IEEE Intelligent Vehicles Symposium, DOI:10.1109/IVS.2017.7995952 and T. Dang, "Continuous Stereo Self-Calibration by Camera Parameter Tracking", August 2009 IEEE Transactions on Image Processing 8(7):1536-40 50, DOI:10.1109/TIP.2009.2017824. These recalibration approaches are based on finding correspondences of features that must fulfill an equation system (e.g. epipolar condition) with respect to the extrinsic parameters. Famous example is the eight-point algorithm. For example, in case of a three dimensional measurement system with one camera and a laser dot projector, the laser spots on the captured camera image may be assumed to be correctly assigned to the laser grid. That means that the correspondences are correctly found. The position of the laser spots on the camera image and the relation of the reference laser grids can be used to get a linear equation system. This linear equation requires at least eight corresponding laser spots to the reference grid. This equation can be solved by a least square fit. An adept usage of a singular value decomposition may determine the rotation and translation of camera and laser projector. However, the results may become very poorly if the correspondences are false.

Known calibration processes may be based on capturing static scenes with defined targets on known distances. For the calibration of 3D sensor every device, e.g. smartphone, has to be mounted on a special calibration device where some measurements have to be done. The 3D sensor may measure images at a plurality of different distances to find a correlation of the projector and sensor's optical path. Therefore, images may be recorded on a flat target at different distances. Typically, a linear stage may be used, which approaches these positions. These images are then transferred to a calibration algorithm and the extrinsic calibration is calculated. However, for scaling purposes, the calibration of 3D sensors has to be simplified. A multi-point measurement of the setup with different distances needs time for each measurement and, thus, is too time consuming.

CN113066134 A describes a visual sensor calibration method and device, electronic equipment and a storage medium. The method comprises the steps of determining first coordinate values of reference points on at least two calibration objects in a world coordinate system, wherein the calibration object includes a first calibration object, the distance between the reference point on the first calibration object and the visual sensor is greater than a first threshold value, and the distance between the reference points on different first calibration objects is greater than a second threshold value; determining a second coordinate value of the reference point in an image collected by the visual sensor; and determining a to-be-calibrated parameter of the visual sensor according to the first coordinate value and the second coordinate value. Further methods for calibration are described in CN113109829 A and CN113052919 A.

PROBLEM ADDRESSED BY THE INVENTION

It is therefore an object of the present invention to provide devices and methods facing the above-mentioned technical challenges of known devices and methods. Specifically, it is an object of the present invention to provide devices and methods allowing a simplified and less time consuming calibration of a 3D sensor.

SUMMARY OF THE INVENTION

This problem is solved by the invention with the features of the independent patent claims. Advantageous developments of the invention, which can be realized individually or in combination, are presented in the dependent claims and/or in the following specification and detailed embodiments.

In a first aspect of the present invention, a method for calibrating a detector comprising at least one camera and at least one projector is disclosed.

The term "calibrating" as used herein is a broad term and is to be given its ordinary and customary meaning to a person of ordinary skill in the art and is not to be limited to a special or customized meaning. The term specifically may refer, without limitation, to a process of finding at least one correlation of the projector and a camera's optical path. The calibration may comprise compensating for misalignment of the projector and the camera. As used herein, the term "alignment" is a broad term and is to be given its ordinary and customary meaning to a person of ordinary skill in the art and is not to be limited to a special or customized meaning. The term specifically may refer, without limitation, to a relative position and/or orientation of the camera and the projector. As used herein, the term "misalignment" is a broad term and is to be given its ordinary and customary meaning to a person of ordinary skill in the art and is not to be limited to a special or customized meaning. The term specifically may refer, without limitation, to a deviation of the relative position and/or orientation of the camera and the projector from a nominal relative position and/or orientation.

The term "detector" as used herein is a broad term and is to be given its ordinary and customary meaning to a person of ordinary skill in the art and is not to be limited to a special or customized meaning. The term specifically may refer, without limitation, to an arbitrary sensor device configured for determining and/or detecting and/or sensing the at least one object. The detector may be a stationary device or a mobile device. Further, the detector may be a stand-alone device or may form part of another device, such as a computer, a vehicle or any other device. Further, the detector may be a hand-held device. Other embodiments of the detector are feasible. The detector may be one of attached to or integrated into a mobile device such as a mobile phone or smartphone. The detector may be integrated in a mobile device, e.g. within a housing of the mobile device. Additionally or alternatively, the detector, or at least one component of the detector, may be attached to the mobile device such as by using a connector such as a USB or phone-connector such as the headphone jack.

The term "projector", also denoted as light projector, as used herein is a broad term and is to be given its ordinary and customary meaning to a person of ordinary skill in the art and is not to be limited to a special or customized meaning. The term specifically may refer, without limitation, to an optical device configured to project at least one illumination pattern onto the object, specifically onto a surface of the object.

The projector is configured for illuminating at least one object with at least one illumination pattern comprising a plurality of illumination features.

The term "pattern" as used herein is a broad term and is to be given its ordinary and customary meaning to a person of ordinary skill in the art and is not to be limited to a special or customized meaning. The term specifically may refer, without limitation, to an arbitrary known or pre-determined arrangement comprising a plurality of arbitrarily shaped features such as symbols. The pattern may comprise a plurality of features. The pattern may comprise an arrangement of periodic or non-periodic features. The term "at least one illumination pattern" as used herein is a broad term and is to be given its ordinary and customary meaning to a person of ordinary skill in the art and is not to be limited to a special or customized meaning. The term specifically may refer, without limitation, to at least one arbitrary pattern comprising the illumination features adapted to illuminate at least one part of the object.

The term "illumination feature" as used herein is a broad term and is to be given its ordinary and customary meaning to a person of ordinary skill in the art and is not to be limited to a special or customized meaning. The term specifically may refer, without limitation, to at least one at least partially extended feature of the pattern. The illumination pattern comprises a plurality of illumination features. The illumination pattern may be a regular, in particular periodic pattern. The illumination pattern may comprise at least one pattern selected from the group consisting of: at least one quasi random pattern; at least one Sobol pattern; at least one quasiperiodic pattern; at least one point pattern, in particular a pseudo-random point pattern; at least one line pattern; at least one stripe pattern; at least one checkerboard pattern; at least one triangular pattern; at least one rectangular pattern; at least one hexagonal pattern or a pattern comprising further convex tilings. The illumination pattern may exhibit the at least one illumination feature selected from the group consisting of: at least one point; at least one line; at least two lines such as parallel or crossing lines; at least one point and one line; at least one arrangement of periodic features; at least one arbitrary shaped featured pattern. For example, the illumination pattern comprises at least one pattern comprising at least one pre-known feature. For example, the illumination pattern comprises at least one line pattern comprising at least one line. For example, the illumination pattern comprises at least one line pattern comprising at least two lines such as parallel or crossing lines. For example, the projector may be configured for generate and/or to project a cloud of points or non-point-like features. For example, the projector may be configured for generate a cloud of points or non-point-like features such that the illumination pattern may comprise a plurality of point features or non-point-like features.

As further used herein, the term "illuminating the object with at least one illumination pattern" may refer to providing the at least one illumination pattern for illuminating the at least one object.

The term "ray" as used herein is a broad term and is to be given its ordinary and customary meaning to a person of ordinary skill in the art and is not to be limited to a special or customized meaning. The term specifically may refer, without limitation, to a line that is perpendicular to wavefronts of light which points in a direction of energy flow. The term "beam" as used herein is a broad term and is to be given its ordinary and customary meaning to a person of ordinary skill in the art and is not to be limited to a special or customized meaning. The term specifically may refer, without limitation, to a collection of rays. In the following, the terms "ray" and "beam" will be used as synonyms. The term "light beam" as used herein is a broad term and is to be given its ordinary and customary meaning to a person of ordinary skill in the art and is not to be limited to a special or customized meaning. The term specifically may refer, without limitation, to an amount of light, specifically an amount of light traveling essentially in the same direction, including the possibility of the light beam having a spreading angle or widening angle. The light beam may have a spatial extension. Specifically, the light beam may have a non-Gaussian beam profile. The beam profile may be selected from the group consisting of a trapezoid beam profile; a triangle beam profile; a conical beam profile. The trapezoid beam profile may have a plateau region and at least one edge region. The light beam specifically may be a Gaussian light beam or a linear combination of Gaussian light beams, as will be outlined in further detail below. Other embodiments are feasible, however.

The projector may comprise at least one emitter and/or at least one array of emitters. Each of the emitters may be configured for emitting at least one light beam.

The light beams generated by the emitters generally may propagate parallel to an optical axis or tilted with respect to the optical axis, e.g. including an angle with the optical axis. The detector may be configured such that the light beam or light beams propagates from the detector towards the object along an optical axis of the detector. For this purpose, the detector may comprise at least one reflective element, preferably at least one prism, for deflecting the light beams onto the optical axis. As an example, the light beams and the optical axis may include an angle of less than 10°, preferably less than 5° or even less than 2°. Other embodiments, however, are feasible. Further, the light beams may be on the optical axis or off the optical axis. As an example, the light beam or light beams may be parallel to the optical axis having a distance of less than 10 mm to the optical axis, preferably less than 5 mm to the optical axis or even less than 1 mm to the optical axis or may even coincide with the optical axis.

The term "emitter" as used herein is a broad term and is to be given its ordinary and customary meaning to a person of ordinary skill in the art and is not to be limited to a special or customized meaning. The term specifically may refer, without limitation, to at least one arbitrary device configured for providing the at least one light beam for illumination of the object. Each of the emitters may be and/or may comprise at least one element selected from the group consisting of at least one laser source such as at least one semi-conductor laser, at least one double heterostructure laser, at least one external cavity laser, at least one separate confinement heterostructure laser, at least one quantum cascade laser, at least one distributed Bragg reflector laser, at least one polariton laser, at least one hybrid silicon laser, at least one extended cavity diode laser, at least one quantum dot laser, at least one volume Bragg grating laser, at least one Indium Arsenide laser, at least one Gallium Arsenide laser, at least one transistor laser, at least one diode pumped laser, at least one distributed feedback lasers, at least one quantum well laser, at least one interband cascade laser, at least one semiconductor ring laser, at least one vertical cavity surface-emitting laser (VCSEL); at least one non-laser light source such as at least one LED or at least one light bulb.

The array of emitters may be a two-dimensional or one dimensional array. The array may comprise a plurality of emitters arranged in a matrix. The term "matrix" as used herein is a broad term and is to be given its ordinary and customary meaning to a person of ordinary skill in the art and is not to be limited to a special or customized meaning. The term specifically may refer, without limitation, to an arrangement of a plurality of elements in a predetermined geometrical order. The matrix specifically may be or may comprise a rectangular matrix having one or more rows and one or more columns. The rows and columns specifically may be arranged in a rectangular fashion. However, other arrangements are feasible, such as nonrectangular arrangements. As an example, circular arrangements are also feasible, wherein the elements are arranged in concentric circles or ellipses about a center point.

For example, the emitters may be an array of VCSELs. The term "vertical-cavity surface-emitting laser" as used herein is a broad term and is to be given its ordinary and customary meaning to a person of ordinary skill in the art and is not to be limited to a special or customized meaning. The term specifically may refer, without limitation, to a semiconductor laser diode configured for laser beam emission perpendicular with respect to a top surface. Examples for VCSELs can be found e.g. in en.wikipedia.org/wikiNertical-cavity_surface-emitting_laser. VCSELs are generally known to the skilled person such as from WO 2017/222618 A. Each of the VCSELs is configured for generating at least one light beam. The VCSELs may be arranged on a common substrate or on different substrates. The array may comprise up to 2500 VCSELs. For example, the array may comprise 38×25 VCSELs, such as a high power array with 3.5 W. For example, the array may comprise 10×27 VCSELs with 2.5 W. For example, the array may comprise 96 VCSELs with 0.9 W. A size of the array, e.g. of 2500 elements, may be up to 2 mm×2 mm.

The light beam emitted by the respective emitter may have a wavelength of 300 to 1100 nm, preferably 500 to 1100 nm. For example, the light beam may have a wavelength of 940 nm. For example, light in the infrared spectral range may be used, such as in the range of 780 nm to 3.0 μm. Specifically, the light in the part of the near infrared region where silicon photodiodes are applicable specifically in the range of 700 nm to 1100 nm may be used. The emitters may be configured for generating the at least one illumination pattern in the infrared region, in particular in the near infrared region. Using light in the near infrared region may allows that light is not or only weakly detected by human eyes and is still detectable by silicon sensors, in particular standard silicon sensors. For example, the emitters may be an array of VCSELs. The VCSELs may be configured for emitting light beams at a wavelength range from 800 to 1000 nm. For example, the VCSELs may be configured for emitting light beams at 808 nm, 850 nm, 940 nm, or 980 nm. Preferably the VCSELs emit light at 940 nm, since terrestrial sun radiation has a local minimum in irradiance at this wavelength, e.g. as described in CIE 085-1989 "Solar spectral Irradiance".

The projector may comprises the transfer device configured for generating the illumination features from the light beams impinging on the transfer device. The term "transfer device", also denoted as "transfer system", may generally refer to one or more optical elements which are adapted to modify the light beam, such as by modifying one or more of a beam parameter of the light beam, a width of the light beam or a direction of the light beam. The transfer device may comprise at least one imaging optical device. The transfer device specifically may comprise one or more of: at least one lens, for example at least one lens selected from the group consisting of at least one focus-tunable lens, at least one aspheric lens, at least one spheric lens, at least one Fresnel lens; at least one diffractive optical element; at least one concave mirror; at least one beam deflection element, preferably at least one mirror; at least one beam splitting element, preferably at least one of a beam splitting cube or a beam splitting mirror; at least one multi-lens system; at least one holographic optical element; at least one meta optical element. Specifically, the transfer device comprises at least one refractive optical lens stack. Thus, the transfer device may comprise a multi-lens system having refractive properties.

The projector may comprise at least one diffractive optical element (DOE) configured for generating the illumination pattern. The DOE may be configured for generating multiple light beams from a single incoming light beam.

The camera has at least one sensor element having a matrix of optical sensors. The optical sensors each having a light-sensitive area. Each optical sensor is designed to generate at least one sensor signal in response to an illumination of its respective light-sensitive area by a light beam propagating from the object to the camera.

As used herein, the term "camera" may refer to a device having at least one imaging element configured for recording or capturing spatially resolved one-dimensional, two-dimensional or even three-dimensional optical data or information. As an example, the camera may comprise at least one camera chip, such as at least one CCD chip and/or at least one CMOS chip configured for recording images. As used herein, without limitation, the term "image" specifically may relate to data recorded by using a camera, such as a plurality of electronic readings from the imaging device, such as the pixels of the camera chip.

As used herein, the term "sensor element" may generally refer to a device or a combination of a plurality of devices configured for sensing at least one parameter. In the present case, the parameter specifically may be an optical parameter, and the sensor element specifically may be an optical sensor element. The sensor element may be formed as a unitary, single device or as a combination of several devices. The matrix specifically may be or may comprise a rectangular matrix having one or more rows and one or more columns. The rows and columns specifically may be arranged in a rectangular fashion. However, other arrangements are feasible, such as nonrectangular arrangements. As an example, circular arrangements are also feasible, wherein the elements are arranged in concentric circles or ellipses about a center point. For example, the matrix may be a single row of pixels. Other arrangements are feasible.

As used herein, an "optical sensor" generally may refer to a light-sensitive device for detecting a light beam, such as for detecting an illumination and/or a light spot generated by at least one light beam. As further used herein, a "light-sensitive area" generally refers to an area of the optical sensor which may be illuminated externally, by the at least one light beam, in response to which illumination the at least one sensor signal is generated. The light-sensitive area may specifically be located on a surface of the respective optical sensor. Other embodiments, however, are feasible. The optical sensors of the matrix specifically may be equal in one or more of size, sensitivity and other optical, electrical and mechanical properties. The light-sensitive areas of all optical sensors of the matrix specifically may be located in a common plane, the common plane preferably facing the object, such that a light beam propagating from the object to the detector may generate a light spot on the common plane.

As used herein, the term "the optical sensors each having at least one light sensitive area" refers to configurations with a plurality of single optical sensors each having one light sensitive area and to configurations with one combined optical sensor having a plurality of light sensitive areas. Thus, the term "optical sensor" furthermore refers to a light-sensitive device configured to generate one output signal, whereas, herein, a light-sensitive device configured to generate two or more output signals, for example at least one CCD and/or CMOS device, is referred to as two or more optical sensors. Each optical sensor may be embodied such that precisely one light-sensitive area is present in the respective optical sensor, such as by providing precisely one light-sensitive area which may be illuminated, in response to which illumination precisely one uniform sensor signal is created for the whole optical sensor. Thus, each optical sensor may be a single area optical sensor. The use of the single area optical sensors, however, renders the setup of the detector specifically simple and efficient. Thus, as an example, commercially available photo-sensors, such as commercially available silicon photodiodes, each having precisely one sensitive area, may be used in the setup. Other embodiments, however, are feasible. Thus, as an example, an optical device comprising two, three, four or more than four light-sensitive areas may be used which is regarded as two, three, four or more than four optical sensors in the context of the present invention. As outlined above, the sensor element comprises a matrix of optical sensors. Thus, as an example, the optical sensors may be part of or constitute a pixelated optical device. As an example, the optical sensors may be part of or constitute at least one CCD and/or CMOS device having a matrix of pixels, each pixel forming a light-sensitive area.

The optical sensors specifically may be or may comprise photodetectors, preferably inorganic photodetectors, more preferably inorganic semiconductor photodetectors, most preferably silicon photodetectors. Specifically, the optical sensors may be sensitive in the infrared spectral range. All of the optical sensors of the matrix or at least a group of the optical sensors of the matrix specifically may be identical. Groups of identical optical sensors of the matrix specifically may be provided for different spectral ranges, or all optical sensors may be identical in terms of spectral sensitivity. Further, the optical sensors may be identical in size and/or with regard to their electronic or optoelectronic properties.

Specifically, the optical sensors may be or may comprise inorganic photodiodes which are sensitive in the infrared spectral range, preferably in the range of 780 nm to 3.0 micrometers. Specifically, the optical sensors may be sensitive in the part of the near infrared region where silicon photodiodes are applicable specifically in the range of 700 nm to 1000 nm. Infrared optical sensors which may be used for optical sensors may be commercially available infrared optical sensors, such as infrared optical sensors commercially available under the brand name Hertzstueck™ from trinamiX GmbH, D-67056 Ludwigshafen am Rhein, Germany. Thus, as an example, the optical sensors may comprise at least one optical sensor of an intrinsic photovoltaic type, more preferably at least one semiconductor photodiode selected from the group consisting of: a Ge photodiode, an InGaAs photodiode, an extended InGaAs photodiode, an InAs photodiode, an InSb photodiode, a HgCdTe photodiode. Additionally or alternatively, the optical sensors may comprise at least one optical sensor of an extrinsic photovoltaic type, more preferably at least one semiconductor photodiode selected from the group consisting of: a Ge:Au photodiode, a Ge:Hg photodiode, a Ge:Cu photodiode, a Ge:Zn photodiode, a Si:Ga photodiode, a Si:As photodiode. Additionally or alternatively, the optical sensors may comprise at least one bolometer, preferably a bolometer selected from the group consisting of a VO bolometer and an amorphous Si bolometer.

The matrix may be composed of independent optical sensors. Thus, a matrix may be composed of inorganic photodiodes. Alternatively, however, a commercially available matrix may be used, such as one or more of a CCD detector, such as a CCD detector chip, and/or a CMOS detector, such as a CMOS detector chip.

Thus, generally, the optical sensors of the detector may form a sensor array or may be part of a sensor array, such as the above-mentioned matrix. Thus, as an example, the detector may comprise an array of optical sensors, such as a rectangular array, having m rows and n columns, with m, n, independently, being positive integers. Preferably, more than one column and more than one row is given, i.e. n>1, m>1. Thus, as an example, n may be 2 to 16 or higher and m may be 2 to 16 or higher. Preferably, the ratio of the number of rows and the number of columns is close to 1. As an example, n and m may be selected such that 0.3 m/n≤3, such as by choosing m/n=1:1, 4:3, 16:9 or similar. As an example, the array may be a square array, having an equal number of rows and columns, such as by choosing m=2, n=2 or m=3, n=3 or the like.

The matrix specifically may be a rectangular matrix having at least one row, preferably a plurality of rows, and a plurality of columns. As an example, the rows and columns may be oriented essentially perpendicular, wherein, with respect to the term "essentially perpendicular", reference may be made to the definition given above. Thus, as an example, tolerances of less than 20°, specifically less than 10° or even less than 5°, may be acceptable. In order to provide a wide range of view, the matrix specifically may have at least 10 rows, preferably at least 50 rows, more preferably at least 100 rows. Similarly, the matrix may have at least 10 columns, preferably at least 50 columns, more preferably at least 100 columns. The matrix may comprise at least 50 optical sensors, preferably at least 100 optical sensors, more preferably at least 500 optical sensors. The matrix may comprise a number of pixels in a multi-mega pixel range. Other embodiments, however, are feasible. Thus, in setups in which an axial rotational symmetry is to be expected, circular arrangements or concentric arrangements of the optical sensors of the matrix, which may also be referred to as pixels, may be preferred.

The sensor element may be oriented essentially perpendicular to an optical axis of the detector. Again, with respect to the term "essentially perpendicular", reference may be made to the definition and the tolerances given above. The optical axis may be a straight optical axis or may be bent or even split, such as by using one or more deflection elements and/or by using one or more beam splitters, wherein the essentially perpendicular orientation, in the latter cases, may refer to the local optical axis in the respective branch or beam path of the optical setup.

The reflection light beam may propagate from the object towards the camera. The reflection light beam may originate from the object. The projector may illuminate the object with the at least one illumination pattern and the light is remitted, reflected and/or scattered by the object and, thereby, is at least partially directed as "reflection light beams" towards the camera.

The light beam generated by the object, also denoted as reflection light beam, specifically may fully illuminate the sensor element such that the sensor element is fully located within the light beam with a width of the light beam being larger than the matrix. Contrarily, preferably, the reflection light beam specifically may create a light spot on the entire matrix which is smaller than the matrix, such that the light spot is fully located within the matrix. This situation may easily be adjusted by a person skilled in the art of optics by choosing one or more appropriate lenses or elements having a focusing or defocusing effect on the light beam, such as by using an appropriate transfer device.

The light-sensitive areas specifically may be oriented towards the object. As used herein, the term "is oriented towards the object" generally refers to the situation that the respective surfaces of the light-sensitive areas are fully or partially visible from the object. Specifically, at least one interconnecting line between at least one point of the object and at least one point of the respective light-sensitive area may form an angle with a surface element of the light-sensitive area which is different from 0°, such as an angle in the range of 20° to 90°, preferably 80 to 90° such as 90°. Thus, when the object is located on the optical axis or close to the optical axis, the light beam propagating from the object towards the detector may be essentially parallel to the optical axis. As used herein, the term "essentially perpendicular" refers to the condition of a perpendicular orientation, with a tolerance of e.g. ±20° or less, preferably a tolerance of ±10° or less, more preferably a tolerance of ±5° or less. Similarly, the term "essentially parallel" refers to the condition of a parallel orientation, with a tolerance of e.g. ±20° or less, preferably a tolerance of ±10° or less, more preferably a tolerance of ±5° or less.

The optical sensors may be sensitive in one or more of the ultraviolet, the visible or the infrared spectral range. Specifically, the optical sensors may be sensitive in the visible spectral range from 500 nm to 780 nm, most preferably at 650 nm to 750 nm or at 690 nm to 700 nm. Specifically, the optical sensors may be sensitive in the near infrared region. Specifically, the optical sensors may be sensitive in the part of the near infrared region where silicon photodiodes are applicable specifically in the range of 700 nm to 1000 nm. The optical sensors, specifically, may be sensitive in the infrared spectral range, specifically in the range of 780 nm to 3.0 micrometers. For example, the optical sensors each, independently, may be or may comprise at least one element selected from the group consisting of a photodiode, a photocell, a photoconductor, a phototransistor or any combination thereof. For example, the optical sensors may be or may comprise at least one element selected from the group consisting of a CCD sensor element, a CMOS sensor element, a photodiode, a photocell, a photoconductor, a phototransistor or any combination thereof. Any other type of photosensitive element may be used. The photosensitive element generally may fully or partially be made of inorganic materials and/or may fully or partially be made of organic materials. Most commonly, one or more photodiodes may be used, such as commercially available photodiodes, e.g. inorganic semiconductor photodiodes.

As further used herein, a "sensor signal" generally refers to a signal generated by an optical sensor in response to the illumination by the light beam. Specifically, the sensor signal may be or may comprise at least one electrical signal, such as at least one analogue electrical signal and/or at least one digital electrical signal. More specifically, the sensor signal may be or may comprise at least one voltage signal and/or at least one current signal. More specifically, the sensor signal may comprise at least one photocurrent. Further, either raw sensor signals may be used, or the detector, the optical sensor or any other element may be configured for process or preprocess the sensor signal, thereby generating secondary sensor signals, which may also be used as sensor signals, such as preprocessing by filtering or the like.

The term "object" as used herein is a broad term and is to be given its ordinary and customary meaning to a person of ordinary skill in the art and is not to be limited to a special or customized meaning. The term specifically may refer, without limitation, to an arbitrary object, in particular a surface or region, which is configured for reflecting and/or scattering at least partially at least one light beam impinging on the object. The light beam may originate from a projector illuminating the object, wherein the light beam is reflected and/or scattered by the object.

The object used for the method for calibrating a detector according to the present invention is a target. The target is positioned at a pre-defined distance from the detector. The term "predefined distance" may refer to a relative distance between the target and the detector. Specifically, the pre-defined distance may be a longitudinal coordinate. The method may comprise manually or automatically positioning the target to the predefined distance, e.g. by using at least one z-stage. The method may comprise at least one positioning step comprising positioning of the target at the pre-defined distance.

The target comprises at least one first target and at least one second target. For example, the target may comprise two target screens. As used herein, the term "target screen" may refer to a projection screen having a planar surface configured for displaying a projected light beam. For example, the target screens may be non-transparent screens. The projector and the camera may be arranged on the same side of the target screens.

The method steps may be performed in the given order or may be performed in a different order. Further, one or more additional method steps may be present which are not listed. Further, one, more than one or even all of the method steps may be performed repeatedly.

The method comprises the following steps:
a) illuminating the first target with a first part of the illumination pattern and illuminating the second target with a second part of the illumination pattern by using the projector, wherein the first and second part of the illumination pattern differ, and imaging by using the camera at least one combined reflection image of the illuminated first target and the illuminated second target, wherein the combined reflection image comprises a plurality of first reflection features generated by the first target in response to the first part of the illumination pattern and a plurality of second reflection features generated by the second target in response to the second part of the illumination pattern;
b) splitting the combined reflection image into a first reflection image and a second reflection image by using at least one evaluation device of the detector, wherein the first reflection image comprises the first reflection features and the second reflection image comprises the second reflection features;
c) for the first reflection image, reconstructing by using the evaluation device missing reflection features relating to the second part of the illumination pattern using the predefined illumination pattern, and, for the second reflection image, reconstructing by using the evaluation device missing reflection features relating to the first part of the illumination pattern using the predefined illumination pattern;
d) determining by using the evaluation device a first reconstructed image by adding the reconstructed reflection features relating to the second part of the illumination pattern to the first reflection image and determining by using the evaluation device a second reconstructed image by adding the reconstructed reflection features relating to the first part of the illumination pattern to the second reflection image;
e) evaluating the first reconstructed image and the second reconstructed image by using the evaluation device, wherein the evaluation comprises
   e1) matching reflection features of the first reconstructed image to reflection features of the second reconstructed image considering the predefined distance of the target and the predefined fixed relative distance of the first target and the second target thereby determining pairs of matched reflection features;
   e2) determining an epipolar line for each of the pairs of the matched reflection features, wherein the respective matched reflection features lie on the epipolar line;
f) determining at least one extrinsic calibration information of the detector using the determined epipolar lines by using the evaluation device.

The first target and the second target have a predefined fixed relative distance. The "predefined fixed relative distance" may refer to a relative position between the first target and the second target which is unchanged and/or invariable at least during imaging of the combined reflection image. The first target and the second target have fixed relative x, y and z coordinates in space. The target may comprise a distinct step. The target may comprise at least one mechanical element and/or at least one mechanical structure configured for holding the first and the second target at the predefined fixed relative distance. The mechanical element and/or at least one mechanical structure may comprise at least one optical bench and/or at least one optical rail. The mechanical element and/or the mechanical structure may be configured for allowing to set and/or adapt the relative distance between the first target and the second target, however, before and/or after the illuminating and imaging only. Alternatively, the mechanical element and/or the mechanical structure may be configured for permanently fixing the relative distance between the first target and the second target. The first target and the second target may form a static structure. As used herein, the term "static" structure may refer to static at least during illuminating and imaging. For example, the first target and the second target may be two target screens positioned at different longitudinal coordinates (z), in particular one behind the other. At least one of the transversal coordinates (x and/or y) may be different, too, such that simultaneous illumination and imaging of the first target and the second target is possible.

The first target may be arranged on a front of a measuring range of the detector and the second target may be arranged on a back of the measuring range of the detector. Specifically, the surfaces of the first target and the second target are positioned on the front and the back of the measuring range. The first target may be a front target and the second target may be a rear target. The term "measuring range" as used herein is a broad term and is to be given its ordinary and customary meaning to a person of ordinary skill in the art and is not to be limited to a special or customized meaning. The term specifically may refer, without limitation, to a range in which measurement deviations remain within specified limits. For example, the fixed relative distance may be 600 mm. For example, the first target may be positioned at a distance of 200 mm from the detector and the second target may be positioned at a distance of 800 mm from the detector.

The detector, e.g. the camera may comprise a further transfer device configured for guiding the light beam onto the optical sensors and for forming the reflection image on the sensor element. The further transfer device may constitute a coordinate system, wherein a longitudinal coordinate z is a coordinate along an optical axis of the transfer device. The coordinate system may be a polar coordinate system in which the optical axis of the transfer device forms a z-axis and in which a distance from the z-axis and a polar angle may be used as additional coordinates. For example, the further transfer device may constitute a coordinate system in which an optical axis of the detector forms the z-axis and in which, additionally, an x-axis and a y-axis may be provided which are perpendicular to the z-axis and which are perpendicular to each other. As an example, the detector may rest at a specific point in this coordinate system, such as at the origin of this coordinate system. A direction parallel or antiparallel to the z-axis may be considered a longitudinal direction, and a coordinate along the z-axis may be considered a longitudinal coordinate. Any direction perpendicular to the z-axis may be considered a transversal direction, and the polar coordinate and/or the polar angle may be considered a transversal coordinate. Alternatively, other types of coordinate systems may be used. Thus, as an example, a polar coordinate system may be used in which the optical axis forms a z-axis and in which a distance from the z-axis and a polar angle may be used as additional coordinates. A direction parallel or antiparallel to the z-axis may be considered a longitudinal direction, and a coordinate along the z-axis may be considered a longitudinal coordinate. Any direction perpendicular to the z-axis may be considered a transversal direction, and the polar coordinate and/or the polar angle may be considered a transversal coordinate.

The first part of the illumination pattern and the second part of the illumination pattern may be halves of the illumination pattern. Half of the illumination features of the illumination pattern may be projected on the first target and the other half may be projected on the second target.

As used herein, the term "reflection image" may generally refer to an image determined by the camera comprising a plurality of reflection features. As used herein, the term "reflection feature" may generally refer to a feature in an image plane generated by the object in response to illumination with at least one illumination feature. The reflection image may comprise the at least one reflection pattern comprising the reflection features. As used herein, the term "imaging at least one reflection image" refers to one or more of capturing, recording and generating of the reflection image.

The term "combined reflection image" as used herein is a broad term and is to be given its ordinary and customary meaning to a person of ordinary skill in the art and is not to be limited to a special or customized meaning. The term specifically may refer, without limitation, to an image comprising both of a reflection image of the illuminated first target and a reflection image of the illuminated second target. Specifically, the combined reflection image is one single image imaged by one single shot of the camera. Only one image may be taken with half of the illumination features projected on the first target, the other half on the second target.

Each of the reflection features comprises at least one beam profile. As used herein, the term "beam profile" generally may refer to a spatial distribution, in particular in at least one plane perpendicular to the propagation of the light beam, of an intensity of the light beam. The beam profile may be a transverse intensity profile of the light beam. The beam profile may be a cross section of the light beam. The beam profile may be selected from the group consisting of a trapezoid beam profile; a triangle beam profile; a conical beam profile and a linear combination of Gaussian beam profiles. Other embodiments are feasible, however.

The term "evaluation device" generally may refer to an arbitrary device adapted to perform the named operations, preferably by using at least one data processing device and, more preferably, by using at least one processor and/or at least one application-specific integrated circuit. Thus, as an example, the at least one evaluation device may comprise at least one data processing device having a software code stored thereon comprising a number of computer commands. The evaluation device may provide one or more hardware elements for performing one or more of the named operations and/or may provide one or more processors with software running thereon for performing one or more of the named operations. Operations, including evaluating the images. Thus, as an example, one or more instructions may be implemented in software and/or hardware. Thus, as an example, the evaluation device may comprise one or more programmable devices such as one or more computers, application-specific integrated circuits (ASICs), Digital Signal Processors (DSPs), or Field Programmable Gate Arrays (FPGAs) which are configured to perform the above-mentioned evaluation. Additionally or alternatively, however, the evaluation device may also fully or partially be embodied by hardware.

The evaluation device may be or may comprise one or more integrated circuits, such as one or more application-specific integrated circuits (ASICs), and/or one or more data processing devices, such as one or more computers, preferably one or more microcomputers and/or microcontrollers, Field Programmable Arrays, or Digital Signal Processors. Additional components may be comprised, such as one or more preprocessing devices and/or data acquisition devices, such as one or more devices for receiving and/or preprocessing of the sensor signals, such as one or more AD-converters and/or one or more filters. Further, the evaluation device may comprise one or more measurement devices, such as one or more measurement devices for measuring electrical currents and/or electrical voltages. Further, the evaluation device may comprise one or more data storage devices. Further, the evaluation device may comprise one or more interfaces, such as one or more wireless interfaces and/or one or more wire-bound interfaces.

The evaluation device can be connected to or may comprise at least one further data processing device that may be used for one or more of displaying, visualizing, analyzing, distributing, communicating or further processing of information, such as information obtained by the optical sensor and/or by the evaluation device. The data processing device, as an example, may be connected or incorporate at least one of a display, a projector, a monitor, an LCD, a TFT, a loudspeaker, a multichannel sound system, an LED pattern, or a further visualization device. It may further be connected or incorporate at least one of a communication device or communication interface, a connector or a port, capable of sending encrypted or unencrypted information using one or more of email, text messages, telephone, Bluetooth, Wi-Fi, infrared or internet interfaces, ports or connections. It may further be connected to or incorporate at least one of a processor, a graphics processor, a CPU, an Open Multimedia Applications Platform (OMAP™), an integrated circuit, a system on a chip such as products from the Apple A series or the Samsung S3C2 series, a microcontroller or microprocessor, one or more memory blocks such as ROM, RAM, EEPROM, or flash memory, timing sources such as oscillators or phase-locked loops, counter-timers, real-time timers, or power-on reset generators, voltage regulators, power management circuits, or DMA controllers. Individual units may further be connected by buses such as AM BA buses or be integrated in an Internet of Things or Industry 4.0 type network.

The evaluation device and/or the data processing device may be connected by or have further external interfaces or ports such as one or more of serial or parallel interfaces or ports, USB, Centronics Port, FireWire, HDMI, Ethernet, Bluetooth, RFID, Wi-Fi, USART, or SPI, or analogue interfaces or ports such as one or more of ADCs or DACs, or standardized interfaces or ports to further devices such as a 2D-camera device using an RGB-interface such as Camera-Link. The evaluation device and/or the data processing device may further be connected by one or more of inter-processor interfaces or ports, FPGA-FPGA-interfaces, or serial or parallel interfaces ports. The evaluation device and the data processing device may further be connected to one or more of an optical disc drive, a CD-RW drive, a DVD+ RW drive, a flash drive, a memory card, a disk drive, a hard disk drive, a solid state disk or a solid state hard disk.

The evaluation device and/or the data processing device may be connected by or have one or more further external connectors such as one or more of phone connectors, RCA connectors, VGA connectors, hermaphrodite connectors, USB connectors, HDMI connectors, 8P8C connectors, BCN connectors, IEC 60320 C14 connectors, optical fiber connectors, D-subminiature connectors, RF connectors, coaxial connectors, SCART connectors, XLR connectors, and/or may incorporate at least one suitable socket for one or more of these connectors.

The term "splitting the combined reflection image" as used herein is a broad term and is to be given its ordinary and customary meaning to a person of ordinary skill in the art and is not to be limited to a special or customized meaning. The term specifically may refer, without limitation, to dividing the combined reflection image into two image regions. The method may comprise determining an edge within the combined reflection image by using the evaluation device. The combined reflection image may be split into the first reflection image and the second reflection image at the position of the edge.

As used herein, the term "related to a part of the illumination pattern" may refer to reflection features being generated by the respective part of the illumination pattern. As outlined above, by construction, the first reflection image may comprise only reflection features generated by the first part of the illumination pattern and the second reflection image may comprise only reflection features generated by the second part of the illumination pattern. Thus, in the first reflection image, the reflection features that would have been generated by the second part of the illumination pattern are missing and in the second reflection image the reflection features that would have been generated by the first part of the illumination pattern are missing. The term "missing reflection feature" as used herein is a broad term and is to be given its ordinary and customary meaning to a person of ordinary skill in the art and is not to be limited to a special or customized meaning. The term specifically may refer, without limitation, to reflection features that would have been generated by the part of the illumination pattern which has not illuminated the respective target.

In step c), for the first and second reflection images the missing reflection features are reconstructed using the predefined illumination pattern. The predefined illumination pattern, also denoted as nominal grid, as outlined above, may be a periodically and regular pattern having predefined positions of the illumination features and predefined distances between the illumination features. The evaluation device may be configured for determining the reflection features missing in the first reflection image and in the second reflection image using the nominal grid. For example, the evaluation device may be configured for comparing the reflection features of the first reflection image with the nominal grid and the reflection features of the second reflection image with the nominal grid for determining the missing reflection features. However, embodiments are feasible in which the evaluation device simply assumes that the reflection features of the other part of the illumination pattern are missing and proceeds with reconstructing the assumed missing reflection features.

The term "reconstructing" as used herein is a broad term and is to be given its ordinary and customary meaning to a person of ordinary skill in the art and is not to be limited to a special or customized meaning. The term specifically may refer, without limitation, to determining a position of a reflection feature in the reflection image. For the reconstruction, the nominal grid may be used. The reconstruction may comprise adapting the position of the illumination features within the nominal grid to an assumed position within the reflection image. The evaluation device may be configured for determining the regularity and/or periodicity of a first reflection pattern comprising the first reflection features of the first reflection image. The evaluation device may be configured for determining a second reflection pattern comprising the second reflection features of the second reflection image. The evaluation device may be configured for reconstructing, for the first reflection image, the missing reflection features relating to the second part of the illumination pattern by adapting the position of the illumination features of the second part of the illumination pattern considering the determined the regularity and/or periodicity of the first reflection pattern. The evaluation device may be configured for reconstructing, for the second reflection image, the missing reflection features relating to the first part of the illumination pattern by adapting the position of the illumination features of the first part of the illumination pattern considering the determined the regularity and/or periodicity of the second reflection pattern. With the help of the nominal grid, the missing part of the reflection pattern can be reconstructed on both halves.

Step d) comprises determining the first reconstructed image by adding the reconstructed reflection features relating to the second part of the illumination pattern to the first reflection image and determining the second reconstructed image by adding the reconstructed reflection features relating to the first part of the illumination pattern to the second reflection image. The term "reconstructed image" as used herein is a broad term and is to be given its ordinary and customary meaning to a person of ordinary skill in the art and is not to be limited to a special or customized meaning. The term specifically may refer, without limitation, to an image comprising on one half of the image imaged reflection features and on another half of the image reconstructed reflection features. These two reconstructed images are used for calibration.

Step e) comprises evaluating the first reconstructed image and the second reconstructed image.

The method may comprise identifying the reflection features in the first reconstructed image and the second reconstructed image by using at least one image analysis and/or image processing algorithm. The evaluation device may be configured for selecting reflection features of the respective first and second reconstructed images. As used herein, the term "select at least one reflection feature" may generally refer to one or more of identifying, determining and choosing at least one reflection feature of the reconstructed image. The evaluation device may be configured for performing at least one image analysis and/or image processing in order to identify the reflection features. The image analysis and/or image processing may use at least one feature detection algorithm. The image analysis and/or image processing may comprise one or more of the following: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue; saturation; and brightness channels; a frequency decomposition; a singular value decomposition; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding;

creating a binary image. The region of interest may be determined manually by a user or may be determined automatically, such as by recognizing an object within the image.

The evaluation device may be configured for performing at least one image correction. The image correction may comprise at least one background subtraction. The evaluation device may be adapted to remove influences from background light from the beam profile, for example, by an imaging without further illumination.

The evaluation device may be configured for matching the reflection features of the first reconstructed image and the second reconstructed image considering the predefined distance of the target and the predefined fixed relative distance of the first target and the second target. The evaluation device may be configured for unambiguously matching the reflection features of the first reconstructed image and the second reconstructed image considering the predefined distance of the target and the predefined fixed relative distance of the first target and the second target. As used herein, the term "matching" may refer to identifying and/or determining and/or evaluating the corresponding reflection features of the first and second reconstructed images. As used herein, the term "corresponding reflection features" may refer to the fact that each of the reflection feature of the first reconstructed image has a corresponding reflection feature in the second reconstructed image that is generated (or would have been generated) by the same illumination feature. As used herein, the term "unambiguously matching" may refer to that only one reflection feature of the first reconstructed image is assigned to one reflection feature of the second reconstructed image and/or that no other reflection feature(s) of the first reconstructed image can be assigned to the same reflection feature of the second reconstructed image and vice versa. As the predefined distances are known, no correspondence problem needs to be solved. Thus, the method may comprise numbering each of the reflection features of the first reconstructed image and the second reconstructed image and matching the corresponding numbers. After step e1), pairs of matched reflection features are known, including their pixel coordinates and their respective predefined distances.

The method further comprises in step e2) determining an epipolar line for each of the pairs of the matched reflection features. The epipolar line for each of the pairs of the matched reflection features is defined by the fact that the respective matched reflection features lie on the same epipolar line. The evaluation device may be configured for determining the epipolar line using the pixel coordinates and predefined distances of the matched the reflection features. For description of epipolar geometry reference is made, for example, to chapter 2 in X. Jiang, H. Bunke: "Dreidimensionales Computersehen" Springer, Berlin Heidelberg, 1997.

Step f) comprises determining an extrinsic calibration information of the detector, in particular of the camera and the projector, using the determined epipolar lines by using the evaluation device. The method may comprise calculating according to the epipolarline geometry the extrinsic calibration information. The method may comprise determining the extrinsic calibration information by evaluating one or more of tilt, shift, distortion of the epipolar lines. For example, the extrinsic calibration information is at least one information selected from the group consisting of: rotation angles between the projector and the camera, translation components between the projector and the camera, aperture angles, center of the sensor element, apertures, focal distance. For example, a translation in z, in particular a z-offset between projector and camera, may lead to tilted epipolar lines. For example, a rotation around the x-axis may lead to a shifted pattern of epipolar lines and trapezoidal distortion.

The method may comprise comparing the extrinsic calibration information to at least one predefined nominal value by using the evaluation device thereby determining a correction for an alignment of the projector and the camera. For example, the predefined nominal value may be at least one predefined nominal value selected from the group consisting of rotation angles between the projector and the camera, translation components between the projector and the camera, aperture angles, center of the sensor element, apertures, focal distance. For example, the predefined nominal value may be a nominal distance value of a translation between the projector and the camera. For example, the nominal value for rotation may be 0° such that the projector and the camera are considered to be positioned in the same plane. The comparing may comprise using at least one mathematical operation for comparing the extrinsic calibration information and the predefined nominal values.

The method may comprise correcting the alignment of the projector and the camera in case the extrinsic calibration information exceeds the predefined nominal value by more than at least one predefined tolerance range. As used herein, the term "correcting" may refer to compensating for a determined misalignment. The correcting of the alignment may comprise adapting a relative position of the projector and the camera, e.g. during manufacturing of the detector, and/or correcting an imaged reflection image, e.g. during operation of the detector. For example, the predefined tolerance range may be ±10% of the nominal value, preferably ±5% of the nominal value, more preferably ±1% of the nominal value. Other embodiments of tolerance ranges, however, are feasible. In case no deviation of the extrinsic calibration information and the respective nominal value within the predefined tolerance range is found, the alignment of the projector and the camera is considered to be "properly". In this case no correction may be required.

The method may comprise at least one verification step, wherein the verifications step comprises repeating steps a) to f) and comparing the extrinsic calibration information to the at least one predefined nominal value for verifying if the correction is successful such that the extrinsic calibration information corresponds to the predefined nominal value at least one within the predefined tolerance range.

In a further aspect, a method for determining a position of at least one object is disclosed. The method comprises calibrating a detector by using the method for calibrating according to the present invention. Thus, with respect to definitions and embodiments reference is made to the method for calibrating according to the present invention.

The method steps may be performed in the given order or may be performed in a different order. Further, one or more additional method steps may be present which are not listed.

Further, one, more than one or even all of the method steps may be performed repeatedly.

The method further comprises the following steps:

illuminating at least one object with at least one illumination pattern comprising a plurality of illumination features by using the projector and imaging by using the camera at least one reflection image comprising a plurality of reflection features generated by the object in response to illumination by the illumination features, wherein each of the reflection features comprises at least one beam profile;

determining at least one longitudinal coordinate for each of the reflection features by analysis of its respective beam profile by using at least one evaluation device of the detector.

In the context of distance measurement, the object may be an arbitrary object. For example, the object may be a human, in particular a human face.

As used herein, the term "position" may refer to at least one item of information regarding a location of the object and/or at least one part of the object in space. Thus, the at least one item of information may imply at least one distance between at least one point of the object and the at least one detector. The distance may be a longitudinal coordinate or may contribute to determining a longitudinal coordinate of the point of the object. Additionally or alternatively, one or more other items of information regarding the location of the object and/or at least one part of the object may be determined. As an example, additionally, at least one transversal coordinate of the object and/or at least one part of the object may be determined. Thus, the position of the object may imply at least one longitudinal coordinate of the object and/or at least one part of the object. Additionally or alternatively, the position of the object may imply at least one transversal coordinate of the object and/or at least one part of the object. Moreover, the position may imply information about orientation of the object in space. As used herein, the term "orientation" may refer to angular position of the object in space. The orientation may be given by three spatial angles.

The analysis of the beam profile may comprise determining at least one first area and at least one second area of the beam profile. The evaluation device may be configured for deriving a combined signal Q by one or more of dividing the first area and the second area, dividing multiples of the first area and the second area, dividing linear combinations of the first area and the second area. The determining of the longitudinal coordinate further may comprise using at least one predetermined relationship between the combined signal Q and a longitudinal coordinate for determining the longitudinal coordinate of the object.

The evaluation device is configured for determining at least one longitudinal coordinate, also denoted as $z_{DPR}$, for each of the reflection features by analysis of their beam profiles. As used herein, the term "analysis of the beam profile" may generally refer to evaluating of the beam profile and may comprise at least one mathematical operation and/or at least one comparison and/or at least symmetrizing and/or at least one filtering and/or at least one normalizing. For example, the analysis of the beam profile may comprise at least one of a histogram analysis step, a calculation of a difference measure, application of a neural network, application of a machine learning algorithm. The evaluation device may be configured for symmetrizing and/or for normalizing and/or for filtering the beam profile, in particular to remove noise or asymmetries from recording under larger angles, recording edges or the like. The evaluation device may filter the beam profile by removing high spatial frequencies such as by spatial frequency analysis and/or median filtering or the like. Summarization may be performed by center of intensity of the light spot and averaging all intensities at the same distance to the center. The evaluation device may be configured for normalizing the beam profile to a maximum intensity, in particular to account for intensity differences due to the recorded distance. The evaluation device may be configured for removing influences from background light from the beam profile, for example, by an imaging without illumination.

The reflection feature may cover or may extend over at least one pixel of the image. For example, the reflection feature may cover or may extend over plurality of pixels. The evaluation device may be configured for determining and/or for selecting all pixels connected to and/or belonging to the reflection feature, e.g. a light spot. The evaluation device may be configured for determining the center of intensity by $$R_{coi} = \frac{1}{l \cdot \sum_j j \cdot r_{pixel}},$$

wherein $R_{coi}$ is a position of center of intensity, $r_{pixel}$ is the pixel position and $l=\Sigma_j I_{total}$ with j being the number of pixels j connected to and/or belonging to the reflection feature and $I_{total}$ being the total intensity.

The evaluation device may be configured for determining the longitudinal coordinate for each of the reflection features by using depth-from-photon-ratio technique, also denoted as beam profile analysis. With respect to depth-from-photon-ratio (DPR) technique reference is made to WO 2018/091649 A1, WO 2018/091638 A1, WO 2018/091640 A1 and C. Lennartz, F. Schick, S. Metz, "Whitepaper—Beam Profile Analysis for 3D imaging and material detection" Apr. 28, 2021, Ludwigshafen, Germany, the full content of which is included by reference.

The evaluation device may be configured for determining the beam profile of each of the reflection features. As used herein, the term "determining the beam profile" refers to identifying at least one reflection feature provided by the optical sensor and/or selecting at least one reflection feature provided by the optical sensor and evaluating at least one intensity distribution of the reflection feature. As an example, a region of the matrix may be used and evaluated for determining the intensity distribution, such as a three-dimensional intensity distribution or a two-dimensional intensity distribution, such as along an axis or line through the matrix. As an example, a center of illumination by the light beam may be determined, such as by determining the at least one pixel having the highest illumination, and a cross-sectional axis may be chosen through the center of illumination. The intensity distribution may an intensity distribution as a function of a coordinate along this cross-sectional axis through the center of illumination. Other evaluation algorithms are feasible.

The analysis of the beam profile of one of the reflection features may comprise determining at least one first area and at least one second area of the beam profile. The first area of the beam profile may be an area A1 and the second area of the beam profile may be an area A2. The evaluation device may be configured for integrating the first area and the second area. The evaluation device may be configured to derive a combined signal Q, also denoted as quotient Q, by one or more of dividing the integrated first area and the integrated second area, dividing multiples of the integrated first area and the integrated second area, dividing linear combinations of the integrated first area and the integrated second area.

The evaluation device may configured for determining at least two areas of the beam profile and/or to segment the beam profile in at least two segments comprising different areas of the beam profile, wherein overlapping of the areas may be possible as long as the areas are not congruent. For example, the evaluation device may be configured for determining a plurality of areas such as two, three, four, five, or up to ten areas. The evaluation device may be configured for segmenting the light spot into at least two areas of the beam profile and/or to segment the beam profile in at least two segments comprising different areas of the beam profile. The evaluation device may be configured for determining for at least two of the areas an integral of the beam profile over the respective area. The evaluation device may be configured for comparing at least two of the determined integrals. Specifically, the evaluation device may be configured for determining at least one first area and at least one second area of the beam profile. As used herein, the term "area of the beam profile" generally refers to an arbitrary region of the beam profile at the position of the optical sensor used for determining the combined signal. The first area of the beam profile and the second area of the beam profile may be one or both of adjacent or overlapping regions. The first area of the beam profile and the second area of the beam profile may be not congruent in area. For example, the evaluation device may be configured for dividing a sensor region of the sensor element into at least two sub-regions, wherein the evaluation device may be configured for dividing the sensor region of the sensor element into at least one left part and at least one right part and/or at least one upper part and at least one lower part and/or at least one inner and at least one outer part. Additionally or alternatively, the detector may comprise at least two optical sensors, wherein the light-sensitive areas of a first optical sensor and of a second optical sensor may be arranged such that the first optical sensor is adapted to determine the first area of the beam profile of the reflection feature and that the second optical sensor is adapted to determine the second area of the beam profile of the reflection feature. The evaluation device may be adapted to integrate the first area and the second area.

The first area of the beam profile may comprise essentially edge information of the beam profile and the second area of the beam profile comprises essentially center information of the beam profile, and/or the first area of the beam profile may comprise essentially information about a left part of the beam profile and the second area of the beam profile comprises essentially information about a right part of the beam profile. The beam profile may have a center, i.e. a maximum value of the beam profile and/or a center point of a plateau of the beam profile and/or a geometrical center of the light spot, and falling edges extending from the center. The second region may comprise inner regions of the cross section and the first region may comprise outer regions of the cross section. As used herein, the term "essentially center information" generally refers to a low proportion of edge information, i.e. proportion of the intensity distribution corresponding to edges, compared to a proportion of the center information, i.e. proportion of the intensity distribution corresponding to the center. Preferably, the center information has a proportion of edge information of less than 10%, more preferably of less than 5%, most preferably the center information comprises no edge content. As used herein, the term "essentially edge information" generally refers to a low proportion of center information compared to a proportion of the edge information. The edge information may comprise information of the whole beam profile, in particular from center and edge regions. The edge information may have a proportion of center information of less than 10%, preferably of less than 5%, more preferably the edge information comprises no center content. At least one area of the beam profile may be determined and/or selected as second area of the beam profile if it is close or around the center and comprises essentially center information. At least one area of the beam profile may be determined and/or selected as first area of the beam profile if it comprises at least parts of the falling edges of the cross section. For example, the whole area of the cross section may be determined as first region.

Other selections of the first area A1 and second area A2 may be feasible. For example, the first area may comprise essentially outer regions of the beam profile and the second area may comprise essentially inner regions of the beam profile. For example, in case of a two-dimensional beam profile, the beam profile may be divided in a left part and a right part, wherein the first area may comprise essentially areas of the left part of the beam profile and the second area may comprise essentially areas of the right part of the beam profile.

The edge information may comprise information relating to a number of photons in the first area of the beam profile and the center information may comprise information relating to a number of photons in the second area of the beam profile. The evaluation device may be configured for determining an area integral of the beam profile. The evaluation device may be configured for determining the edge information by integrating and/or summing of the first area. The evaluation device may be configured for determining the center information by integrating and/or summing of the second area. For example, the beam profile may be a trapezoid beam profile and the evaluation device may be configured for determining an integral of the trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

In one embodiment, A1 may correspond to a full or complete area of a feature point on the optical sensor. A2 may be a central area of the feature point on the optical sensor. The central area may be a constant value. The central area may be smaller compared to the full area of the feature point. For example, in case of a circular feature point, the central area may have a radius from 0.1 to 0.9 of a full radius of the feature point, preferably from 0.4 to 0.6 of the full radius.

In one embodiment, the illumination pattern may comprise at least point pattern. A1 may correspond to an area with a full radius of a point of the point pattern on the optical sensors. A2 may be a central area of the point in the point pattern on the optical sensors. The central area may be a constant value. The central area may have a radius compared to the full radius. For example, the central area may have a radius from 0.1 to 0.9 of the full radius, preferably from 0.4 to 0.6 of the full radius.

The evaluation device may be configured to derive the quotient Q by one or more of dividing the first area and the second area, dividing multiples of the first area and the second area, dividing linear combinations of the first area and the second area. The evaluation device may be configured for deriving the quotient Q by $$Q = \frac{\int\int_{A1} E(x, y)dxdy}{\int\int_{A2} E(x, y)dxdy}$$

wherein x and y are transversal coordinates, A1 and A2 are the first and second area of the beam profile, respectively, and E(x,y) denotes the beam profile.

Additionally or alternatively, the evaluation device may be adapted to determine one or both of center information or edge information from at least one slice or cut of the light spot. This may be realized, for example, by replacing the area integrals in the quotient Q by a line integral along the slice or cut. For improved accuracy, several slices or cuts through the light spot may be used and averaged. In case of an elliptical spot profile, averaging over several slices or cuts may result in improved distance information.

For example, in case of the optical sensor having a matrix of pixels, the evaluation device may be configured for evaluating the beam profile, by
- determining the pixel having the highest sensor signal and forming at least one center signal;
- evaluating sensor signals of the matrix and forming at least one sum signal;
- determining the quotient Q by combining the center signal and the sum signal; and
- determining at least one longitudinal coordinate z of the object by evaluating the quotient Q.

The sensor signal may be a signal generated by the optical sensor and/or at least one pixel of the optical sensor in response to illumination. Specifically, the sensor signal may be or may comprise at least one electrical signal, such as at least one analogue electrical signal and/or at least one digital electrical signal. More specifically, the sensor signal may be or may comprise at least one voltage signal and/or at least one current signal. More specifically, the sensor signal may comprise at least one photocurrent. Further, either raw sensor signals may be used, or the detector, the optical sensor or any other element may be adapted to process or preprocess the sensor signal, thereby generating secondary sensor signals, which may also be used as sensor signals, such as preprocessing by filtering or the like. The term "center signal" generally refers to the at least one sensor signal comprising essentially center information of the beam profile. As used herein, the term "highest sensor signal" refers to one or both of a local maximum or a maximum in a region of interest. For example, the center signal may be the signal of the pixel having the highest sensor signal out of the plurality of sensor signals generated by the pixels of the entire matrix or of a region of interest within the matrix, wherein the region of interest may be predetermined or determinable within an image generated by the pixels of the matrix. The center signal may arise from a single pixel or from a group of optical sensors, wherein, in the latter case, as an example, the sensor signals of the group of pixels may be added up, integrated or averaged, in order to determine the center signal. The group of pixels from which the center signal arises may be a group of neighboring pixels, such as pixels having less than a predetermined distance from the actual pixel having the highest sensor signal, or may be a group of pixels generating sensor signals being within a predetermined range from the highest sensor signal. The group of pixels from which the center signal arises may be chosen as large as possible in order to allow maximum dynamic range. The evaluation device may be adapted to determine the center signal by integration of the plurality of sensor signals, for example the plurality of pixels around the pixel having the highest sensor signal. For example, the beam profile may be a trapezoid beam profile and the evaluation device may be adapted to determine an integral of the trapezoid, in particular of a plateau of the trapezoid.

As outlined above, the center signal generally may be a single sensor signal, such as a sensor signal from the pixel in the center of the light spot, or may be a combination of a plurality of sensor signals, such as a combination of sensor signals arising from pixels in the center of the light spot, or a secondary sensor signal derived by processing a sensor signal derived by one or more of the aforementioned possibilities. The determination of the center signal may be performed electronically, since a comparison of sensor signals is fairly simply implemented by conventional electronics, or may be performed fully or partially by software. Specifically, the center signal may be selected from the group consisting of: the highest sensor signal; an average of a group of sensor signals being within a predetermined range of tolerance from the highest sensor signal; an average of sensor signals from a group of pixels containing the pixel having the highest sensor signal and a predetermined group of neighboring pixels; a sum of sensor signals from a group of pixels containing the pixel having the highest sensor signal and a predetermined group of neighboring pixels; a sum of a group of sensor signals being within a predetermined range of tolerance from the highest sensor signal; an average of a group of sensor signals being above a predetermined threshold; a sum of a group of sensor signals being above a predetermined threshold; an integral of sensor signals from a group of optical sensors containing the optical sensor having the highest sensor signal and a predetermined group of neighboring pixels; an integral of a group of sensor signals being within a predetermined range of tolerance from the highest sensor signal; an integral of a group of sensor signals being above a predetermined threshold.

Similarly, the term "sum signal" generally refers to a signal comprising essentially edge information of the beam profile. For example, the sum signal may be derived by adding up the sensor signals, integrating over the sensor signals or averaging over the sensor signals of the entire matrix or of a region of interest within the matrix, wherein the region of interest may be predetermined or determinable within an image generated by the optical sensors of the matrix.

When adding up, integrating over or averaging over the sensor signals, the actual optical sensors from which the sensor signal is generated may be left out of the adding, integration or averaging or, alternatively, may be included into the adding, integration or averaging. The evaluation device may be adapted to determine the sum signal by integrating signals of the entire matrix, or of the region of interest within the matrix. For example, the beam profile may be a trapezoid beam profile and the evaluation device may be adapted to determine an integral of the entire trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Similarly, the center signal and edge signal may also be determined by using segments of the beam profile such as circular segments of the beam profile. For example, the beam profile may be divided into two segments by a secant or a chord that does not pass the center of the beam profile. Thus, one segment will essentially contain edge information, while the other segment will contain essentially center information. For example, to further reduce the amount of edge information in the center signal, the edge signal may further be subtracted from the center signal.

The quotient Q may be a signal which is generated by combining the center signal and the sum signal. Specifically, the determining may include one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa. Additionally or alternatively, the quotient Q may comprise an arbitrary signal or signal combination which contains at least one item of information on a comparison between the center signal and the sum signal.

As used herein, the term "longitudinal coordinate of the object" refers to a distance between the optical sensor and the object. The evaluation device may be configured for using the at least one predetermined relationship between the combined signal and the longitudinal coordinate for determining the longitudinal coordinate. The predetermined relationship may be one or more of an empiric relationship, a semi-empiric relationship and an analytically derived relationship. The evaluation device may comprise at least one data storage device for storing the predetermined relationship, such as a lookup list or a lookup table.

The evaluation device may be configured for executing at least one depth-from-photon-ratio algorithm which computes distances for all reflection features with zero order and higher order.

The evaluation device may be configured for assigning said reflection feature to the corresponding emitter. As used herein, the term "assigning said reflection feature to the corresponding emitter of the array" may generally refer to determining, in particular unambiguously, the one emitter of the array having emitted the illumination feature having caused the selected reflection feature. In known 3D sensing devices, such as devices using triangulation or structured light techniques, solving this correspondence problem is complex and time consuming. The evaluation device may be configured for unambiguously matching of reflection features with corresponding emitters by using the longitudinal coordinate $z_{DPR}$. The longitudinal coordinate determined with the depth-from-photon-ratio technique can be used for solving the correspondence problem. In that way, distance information per reflection feature can be used to find the correspondence to the array of emitters. The matching comprise identifying and/or determining and/or evaluating the corresponding emitter and the reflection feature. As used herein, the term "corresponding emitter and reflection feature" may refer to the fact that each of the illumination features of the illumination pattern was generate by one of the emitters, projected to the objected and imaged as reflection feature by the camera, wherein the imaged reflection feature is assigned to the illumination feature having generated said reflection feature.

The illumination feature, and thus, the emitter, corresponding to the reflection feature may be determined using epipolar geometry. For description of epipolar geometry reference is made, for example, to chapter 2 in X. Jiang, H. Bunke: "Dreidimensionales Computersehen" Springer, Berlin Heidelberg, 1997. Epipolar geometry may assume that an illumination image, i.e. an image of the non-distorted illumination pattern, and the reflection image may be images determined at different spatial positions and/or spatial orientations having a fixed distance. The distance may be a relative distance, also denoted as baseline. The illumination image may be also denoted as reference image. The evaluation device may be adapted to determine an epipolar line in the reference image. The relative position of the reference image and reflection image may be known. For example, the relative position of the reference image and the reflection image may be stored within at least one storage unit of the evaluation device. The evaluation device may be adapted to determine a straight line extending from a selected reflection feature of the reflection image to a real world feature from which it originates. Thus, the straight line may comprise possible object features corresponding to the selected reflection feature. The straight line and the baseline span an epipolar plane. As the reference image is determined at a different relative constellation from the reflection image, the corresponding possible object features may be imaged on a straight line, called epipolar line, in the reference image. The epipolar line may be the intersection of the epipolar plane and the reference image. Thus, a feature of the reference image corresponding to the selected feature of the reflection image lies on the epipolar line.

Depending on the distance to the object having reflected the illumination feature, the reflection feature corresponding to the illumination feature may be displaced within the reflection image. The reference image may comprise at least one displacement region in which the illumination feature corresponding to the selected reflection feature would be imaged. The displacement region may comprise only one illumination feature. The displacement region may also comprise more than one illumination feature. The displacement region may comprise an epipolar line or a section of an epipolar line. The displacement region may comprise more than one epipolar line or more sections of more than one epipolar line. The displacement region may extend along the epipolar line, orthogonal to an epipolar line, or both. The evaluation device may be adapted to determine the illumination feature along the epipolar line. The evaluation device may be adapted to determine the longitudinal coordinate z for the reflection feature and an error interval ±ε from the combined signal Q to determine a displacement region along an epipolar line corresponding to z±ε or orthogonal to an epipolar line. The measurement uncertainty of the distance measurement using the combined signal Q may result in a displacement region in the second image which is non-circular since the measurement uncertainty may be different for different directions. Specifically, the measurement uncertainty along the epipolar line or epipolar lines may be greater than the measurement uncertainty in an orthogonal direction with respect to the epipolar line or lines. The displacement region may comprise an extend in an orthogonal direction with respect to the epipolar line or epipolar lines. The evaluation device may be adapted to match the selected reflection feature with at least one illumination feature within the displacement region. The evaluation device may be adapted to match the selected feature of the reflection image with the illumination feature within the displacement region by using at least one evaluation algorithm considering the determined longitudinal coordinate $z_{DPR}$. The evaluation algorithm may be a linear scaling algorithm. The evaluation device may be adapted to determine the epipolar line closest to and/or within the displacement region. The evaluation device may be adapted to determine the epipolar line closest to the image position of the reflection feature. The extent of the displacement region along the epipolar line may be larger than the extent of the displacement region orthogonal to the epipolar line. The evaluation device may be adapted to determine an epipolar line before determining a corresponding illumination feature. The evaluation device may determine a displacement region around the image position of each reflection feature. The evaluation device may be adapted to assign an epipolar line to each displacement region of each image position of the reflection features, such as by assigning the epipolar line closest to a displacement region and/or within a displacement region and/or closest to a displacement region along a direction orthogonal to the epipolar line. The evaluation device may be adapted to determine the illumination feature corresponding to the reflection feature by determining the illumination feature closest to the assigned displacement region and/or within the assigned displacement region and/or closest to the assigned displacement region along the assigned epipolar line and/or within the assigned displacement region along the assigned epipolar line.

Additionally or alternatively, the evaluation device may be configured to perform the following steps:

Determining a displacement region for the image position of each reflection feature;

Assigning an epipolar line to the displacement region of each reflection feature such as by assigning the epipolar line closest to a displacement region and/or within a displacement region and/or closest to a displacement region along a direction orthogonal to the epipolar line;

Assigning and/or determining at least one illumination feature to each reflection feature such as by assigning the illumination feature closest to the assigned displacement region and/or within the assigned displacement region and/or closest to the assigned displacement region along the assigned epipolar line and/or within the assigned displacement region along the assigned epipolar line.

Additionally or alternatively, the evaluation device may be adapted to decide between more than one epipolar line and/or illumination feature to be assigned to a reflection feature such as by comparing distances of reflection features and/or epipolar lines within the illumination image and/or by comparing error weighted distances, such as ϵ-weighted distances of illumination features and/or epipolar lines within the illumination image and assigning the epipolar line and/or illumination feature in shorter distance and/or ϵ-weighted distance to the illumination feature and/or reflection feature.

The evaluation device may be configured for determining at least one longitudinal coordinate $z_{triang}$ by using at least one triangulation method. The evaluation device may be adapted to determine a displacement of the illumination feature and the reflection feature. The evaluation device may be adapted to determine the displacement of the matched illumination feature and the selected reflection feature. The evaluation device, e.g. at least one data processing device of the evaluation device, may be configured to determine the displacement of the illumination feature and the reflection feature, in particular by comparing the respective image position of the illumination image and the reflection image. As used herein, the term "displacement" may refer to the difference between an image position in the illumination image to an image position in the reflection image. The evaluation device may be adapted to determine the longitudinal coordinate of the matched feature using a predetermined relationship between the longitudinal coordinate and the displacement. The evaluation device may be adapted to determine the pre-determined relationship by using triangulation methods. Other methods for determining at least one longitudinal coordinate such as depth-from-defocus and/or structured light techniques may be possible, too.

In a further aspect, a detector for determining a position of at least one object is disclosed. The detector comprising at least one projector for illuminating at least one object with at least one illumination pattern comprising a plurality of illumination features, at least one camera having at least one sensor element having a matrix of optical sensors, the optical sensors each having a light-sensitive area, wherein each optical sensor is designed to generate at least one sensor signal in response to an illumination of its respective light-sensitive area by a reflection light beam propagating from the object to the camera, wherein the camera is configured for imaging at least one reflection image comprising a plurality of reflection features generated by the object in response to illumination by the illumination features;

at least one evaluation device configured for performing the method according to the present invention referring a method for calibrating a detector and/or the method for determining a position of at least one object according to the present invention referring a method for determining a position of at least one object.

With respect to embodiments and definitions of the detector, reference is made to the description of the methods.

The projector may comprise at least one emitter and/or at least one array of emitters. Each of the emitters may be and/or may comprise at least one element selected from the group consisting of at least one laser source such as at least one semi-conductor laser, at least one double heterostructure laser, at least one external cavity laser, at least one separate confinement heterostructure laser, at least one quantum cascade laser, at least one distributed Bragg reflector laser, at least one polariton laser, at least one hybrid silicon laser, at least one extended cavity diode laser, at least one quantum dot laser, at least one volume Bragg grating laser, at least one Indium Arsenide laser, at least one Gallium Arsenide laser, at least one transistor laser, at least one diode pumped laser, at least one distributed feedback lasers, at least one quantum well laser, at least one interband cascade laser, at least one semiconductor ring laser, at least one vertical cavity surface-emitting laser; at least one non-laser light source such as at least one LED or at least one light bulb.

The camera may comprise at least one CCD sensor or at least one CMOS sensor.

The evaluation device may be configured for determining the longitudinal coordinate for each of the reflection features by analysis of its beam profile, wherein the analysis of the beam profile comprises determining at least one first area and at least one second area of the beam profile.

The evaluation device may be configured for deriving a combined signal Q by one or more of dividing the first area and the second area, dividing multiples of the first area and the second area, dividing linear combinations of the first area and the second area. The evaluation device may be configured for using at least one predetermined relationship between the combined signal Q and a longitudinal coordinate for determining the longitudinal coordinate of the object.

In a further aspect, a kit is disclosed. The kit comprises a detector according to the present invention such as according to one or more of the embodiments disclosed above or according to one or more of the embodiments disclosed in further detail below. For details, options and definitions, reference may be made to the methods and detector as discussed above. The kit further comprises a target. The target comprises at least one first target and at least one second target, wherein the first target and the second target have a predefined fixed relative distance. For details, options and definitions relating to the target, reference may be made to the description of the methods and detector as discussed above.

In a further aspect, a mobile device is disclosed. The mobile device comprises at least one detector according to the present invention such as according to one or more of the embodiments disclosed above or according to one or more of the embodiments disclosed in further detail below. For details, options and definitions, reference may be made to the methods and detector as discussed above. The mobile device is one or more of a mobile communication device such as a cell phone or smartphone, a tablet computer, a portable computer.

In a further aspect a computer program is disclosed including computer-executable instructions for performing the method for calibrating and/or for determining a position according to the present invention when the program is executed on a computer or computer network.

Specifically, the computer program may be stored on a computer-readable data carrier and/or on a computer-readable storage medium. As used herein, the terms "computer-readable data carrier" and "computer-readable storage medium" specifically may refer to non-transitory data storage means, such as a hardware storage medium having stored thereon computer-executable instructions. The computer-readable data carrier or storage medium specifically may be or may comprise a storage medium such as a random-access memory (RAM) and/or a read-only memory (ROM).

Thus, specifically, one, more than one or even all of method steps as indicated above may be performed by using a computer or a computer network, preferably by using a computer program.

Further disclosed and proposed herein is a computer program product having program code means, in order to perform one or more of the methods according to the present invention in one or more of the embodiments enclosed herein when the program is executed on a computer or computer network. Specifically, the program code means may be stored on a computer-readable data carrier and/or on a computer-readable storage medium.

Further disclosed and proposed herein is a data carrier having a data structure stored thereon, which, after loading into a computer or computer network, such as into a working memory or main memory of the computer or computer network, may execute one or more of the methods according to one or more of the embodiments disclosed herein.

Further disclosed and proposed herein is a computer program product with program code means stored on a machine-readable carrier, in order to perform one or more of the methods according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier and/or on a computer-readable storage medium. Specifically, the computer program product may be distributed over a data network.

Finally, disclosed and proposed herein is a modulated data signal which contains instructions readable by a computer system or computer network, for performing one or more of the methods according to one or more of the embodiments disclosed herein.

Referring to the computer-implemented aspects of the invention, one or more of the method steps or even all of the method steps of the methods according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing the actual measurements.

Specifically, further disclosed herein are:

a computer or computer network comprising at least one processor, wherein the processor is adapted to perform one or more of the methods according to one of the embodiments described in this description, a computer loadable data structure that is adapted to perform one or more of the methods according to one of the embodiments described in this description while the data structure is being executed on a computer, a computer program, wherein the computer program is adapted to perform one or more of the methods according to one of the embodiments described in this description while the program is being executed on a computer, a computer program comprising program means for performing one or more of the methods according to one of the embodiments described in this description while the computer program is being executed on a computer or on a computer network, a computer program comprising program means according to the preceding embodiment, wherein the program means are stored on a storage medium readable to a computer, a storage medium, wherein a data structure is stored on the storage medium and wherein the data structure is adapted to perform one or more of the methods according to one of the embodiments described in this description after having been loaded into a main and/or working storage of a computer or of a computer network, and a computer program product having program code means, wherein the program code means can be stored or are stored on a storage medium, for performing one or more of the methods according to one of the embodiments described in this description, if the program code means are executed on a computer or on a computer network.

In a further aspect of the present invention, use of the detector according to the present invention, such as according to one or more of the embodiments given above or given in further detail below, is proposed, for a purpose of use, selected from the group consisting of: a position measurement in traffic technology; an entertainment application; a security application; a surveillance application; a safety application; a human-machine interface application; a logistics application; a tracking application; an outdoor application; a mobile application; a communication application; a photography application; a machine vision application; a robotics application; a quality control application; a manufacturing application; a gait monitoring application; a human body monitoring application; home care; smart living, automotive application.

With respect to further uses of the detector and devices of the present invention reference is made to WO 2018/091649 A1, WO 2018/091638 A1, WO 2018/091640 A1 and C. Lennartz, F. Schick, S. Metz, "Whitepaper—Beam Profile Analysis for 3D imaging and material detection" Apr. 28, 2021, Ludwigshafen, Germany, the content of which is included by reference.

As used herein, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically are used only once when introducing the respective feature or element. Herein, in most cases, when referring to the respective feature or element, the expressions "at least one" or "one or more" are not repeated, non-withstanding the fact that the respective feature or element may be present once or more than once.

Further, as used herein, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person recognizes, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such a way with other optional or non-optional features of the invention.

Overall, in the context of the present invention, the following embodiments are regarded as preferred:

Embodiment 1. A method for calibrating a detector comprising at least one camera and at least one projector, wherein the projector is configured for illuminating at least one target with at least one predefined illumination pattern comprising a plurality of illumination features, wherein the camera has at least one sensor element having a matrix of optical sensors, the optical sensors each having a light-sensitive area, wherein each optical sensor is designed to generate at least one sensor signal in response to an illumination of its respective light-sensitive area by a light beam propagating from the target to the camera, wherein the target comprises at least one first target and at least one second target, wherein the first target and the second target have a predefined fixed relative distance, wherein the target is positioned at a pre-defined distance from the detector, wherein the method comprises the following steps:
a) illuminating the first target with a first part of the illumination pattern and illuminating the second target with a second part of the illumination pattern by using the projector, wherein the first and second part of the illumination pattern differ, and imaging by using the camera at least one combined reflection image of the illuminated first target and the illuminated second target, wherein the combined reflection image comprises a plurality of first reflection features generated by the first target in response to the first part of the illumination pattern and a plurality of second reflection features generated by the second target in response to the second part of the illumination pattern;
b) splitting the combined reflection image into a first reflection image and a second reflection image by using at least one evaluation device of the detector, wherein the first reflection image comprises the first reflection features and the second reflection image comprises the second reflection features;
c) for the first reflection image, reconstructing by using the evaluation device missing reflection features relating to the second part of the illumination pattern using the predefined illumination pattern, and, for the second reflection image, reconstructing by using the evaluation device missing reflection features relating to the first part of the illumination pattern using the predefined illumination pattern;
d) determining by using the evaluation device a first reconstructed image by adding the reconstructed reflection features relating to the second part of the illumination pattern to the first reflection image and determining by using the evaluation device a second reconstructed image by adding the reconstructed reflection features relating to the first part of the illumination pattern to the second reflection image;
e) evaluating the first reconstructed image and the second reconstructed image by using the evaluation device, wherein the evaluation comprises
   e1) matching reflection features of the first reconstructed image to reflection features of the second reconstructed image considering the predefined distance of the target and the predefined fixed relative distance of the first target and the second target thereby determining pairs of matched reflection features;
   e2) determining an epipolar line for each of the pairs of the matched reflection features, wherein the respective matched reflection features lie on the epipolar line;
f) determining at least one extrinsic calibration information of the detector using the determined epipolar lines by using the evaluation device.

Embodiment 2. The method according to the preceding embodiment, the combined reflection image is one single image imaged by one single shot of the camera.

Embodiment 3. The method according to any one of the preceding embodiments, wherein the extrinsic calibration information is at least one information selected from the group consisting of: rotation angles between the projector and the camera, translation components between the projector and the camera, aperture angles, center of the sensor element, apertures, focal distance.

Embodiment 4. The method according to any one of the preceding embodiments, wherein the method comprises determining the extrinsic calibration information by evaluating one or more of tilt, shift, distortion of the epipolar lines.

Embodiment 5. The method according to any one of the preceding embodiments, wherein the first target and the second target form a static structure.

Embodiment 6. The method according to any one of the preceding embodiments, wherein the first target is arranged on a front of a measuring range of the detector and the second target is arranged on a back of the measuring range of the detector.

Embodiment 7. The method according to any one of the preceding embodiments, wherein the first part of the illumination pattern and the second part of the illumination pattern are halves of the illumination pattern, wherein half of the illumination features of the illumination pattern are projected on the first target and the other half is projected on the second target.

Embodiment 8. The method according to any one of the preceding embodiments, wherein the method comprises determining an edge within the combined reflection image by using the evaluation device, wherein the combined reflection image is split into the first reflection image and the second reflection image at the position of the edge.

Embodiment 9. The method according to any one of the preceding embodiments, wherein the method comprises identifying the reflection features of the first reconstructed image and the second reconstructed image by using at least one image analysis and/or image processing algorithm.

Embodiment 10. The method according to any one of the preceding embodiments, wherein the method comprises comparing the extrinsic calibration information to at least one predefined nominal value by using the evaluation device thereby determining a correction for an alignment of the projector and the camera.

Embodiment 11. The method according the preceding embodiment, wherein the method comprises correcting the alignment of the projector and the camera in case the extrinsic calibration information exceeds the predefined nominal value by more than at least one predefined tolerance range.

Embodiment 12. The method according to the preceding embodiment, wherein the correcting of the alignment comprises adapting a relative position of the projector and the camera and/or correcting a reflection image imaged by the camera.

Embodiment 13. The method according to any one of the three preceding embodiments, wherein the method comprises at least one verification step, wherein the verifications step comprises repeating steps a) to f) and comparing the extrinsic calibration information to the at least one predefined nominal value for verifying if the correction is successful such that the extrinsic calibration information corresponds to the predefined nominal value at least one within the predefined tolerance range.

Embodiment 14. A method for determining a position of at least one object, the method comprises calibrating a detector by using the method for calibrating according to any one of the preceding embodiments, wherein the method further comprises the following steps:

illuminating at least one object with at least one illumination pattern comprising a plurality of illumination features by using the projector and imaging by using the camera at least one reflection image comprising a plurality of reflection features generated by the object in response to illumination by the illumination features, wherein each of the reflection features comprises at least one beam profile;

determining at least one longitudinal coordinate for each of the reflection features by analysis of its respective beam profile by using at least one evaluation device of the detector.

Embodiment 15. The method according to the preceding embodiment, wherein the analysis of the beam profile comprises determining at least one first area and at least one second area of the beam profile, and deriving a combined signal Q by one or more of dividing the first area and the second area, dividing multiples of the first area and the second area, dividing linear combinations of the first area and the second area, wherein the determining of the longitudinal coordinate further comprises using at least one predetermined relationship between the combined signal Q and a longitudinal coordinate for determining the longitudinal coordinate of the object.

Embodiment 16. A detector for determining a position of at least one object, the detector comprising
at least one projector for illuminating at least one object with at least one illumination pattern comprising a plurality of illumination features,
at least one camera having at least one sensor element having a matrix of optical sensors, the optical sensors each having a light-sensitive area, wherein each optical sensor is designed to generate at least one sensor signal in response to an illumination of its respective light-sensitive area by a reflection light beam propagating from the object to the camera, wherein the camera is configured for imaging at least one reflection image comprising a plurality of reflection features generated by the object in response to illumination by the illumination features;
at least one evaluation device configured for performing the method according to any one of the preceding embodiments referring a method for calibrating a detector and/or the method for determining a position of at least one object according to any one of the preceding embodiments referring a method for determining a position of at least one object.

Embodiment 17. The detector according to the preceding embodiment, wherein the projector comprises at least one emitter and/or at least one array of emitters, wherein each of the emitters is and/or comprises at least one element selected from the group consisting of at least one laser source such as at least one semiconductor laser, at least one double heterostructure laser, at least one external cavity laser, at least one separate confinement heterostructure laser, at least one quantum cascade laser, at least one distributed Bragg reflector laser, at least one polariton laser, at least one hybrid silicon laser, at least one extended cavity diode laser, at least one quantum dot laser, at least one volume Bragg grating laser, at least one Indium Arsenide laser, at least one Gallium Arsenide laser, at least one transistor laser, at least one diode pumped laser, at least one distributed feedback lasers, at least one quantum well laser, at least one interband cascade laser, at least one semiconductor ring laser, at least one vertical cavity surface-emitting laser; at least one non-laser light source such as at least one LED or at least one light bulb.

Embodiment 18. The detector according to any one of the preceding embodiments referring to a detector, wherein the camera comprises at least one CCD sensor or at least one CMOS sensor.

Embodiment 19. The detector according to any one of the preceding embodiments referring to a detector, wherein the evaluation device is configured for determining the longitudinal coordinate for each of the reflection features by analysis of its beam profile, wherein the analysis of the beam profile comprises determining at least one first area and at least one second area of the beam profile, wherein the evaluation device is configured for deriving a combined signal Q by one or more of dividing the first area and the second area, dividing multiples of the first area and the second area, dividing linear combinations of the first area and the second area, wherein the evaluation device is configured for using at least one predetermined relationship between the combined signal Q and a longitudinal coordinate for determining the longitudinal coordinate of the object.

Embodiment 20. A kit comprising a detector according to any one of the preceding embodiments referring to a detector, and a target, wherein the target comprises at least one first target and at least one second target, wherein the first target and the second target have a predefined fixed relative distance.

Embodiment 21. A mobile device comprising at least one detector according to any one of the preceding embodiments referring to a detector, wherein the mobile device is one or more of a mobile communication device, a tablet computer, a portable computer.

Embodiment 22. A use of the detector according to any one of the preceding embodiments referring to a detector, for a purpose of use, selected from the group consisting of: a position measurement in traffic technology; an entertainment application; a security application; a surveillance application; a safety application; a human-machine interface application; a logistics application; a tracking application; an outdoor application; a mobile application; a communication application; a photography application; a machine vision application; a robotics application; a quality control application; a manufacturing application; a gait monitoring application; a human body monitoring application; home care; smart living, automotive application.

BRIEF DESCRIPTION OF THE FIGURES

Further optional details and features of the invention are evident from the description of preferred exemplary embodiments which follows in conjunction with the dependent claims. In this context, the particular features may be implemented in an isolated fashion or in combination with other features. The invention is not restricted to the exemplary embodiments. The exemplary embodiments are shown schematically in the figures. Identical reference numerals in the individual figures refer to identical elements or elements with identical function, or elements which correspond to one another with regard to their functions.

Specifically, in the figures.

DETAILED DESCRIPTION OF THE EMBODIMENTS

Figure 1:
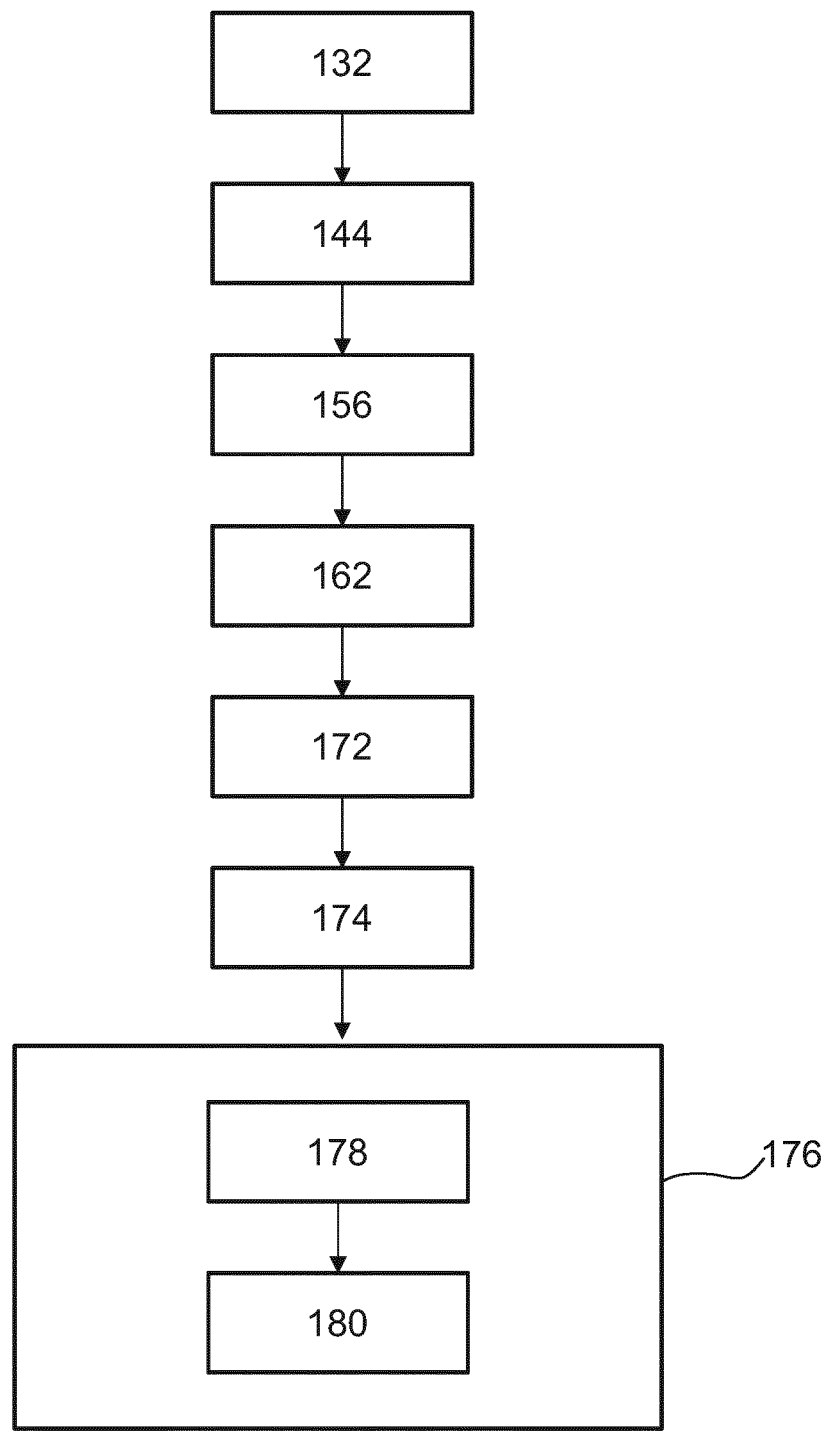
FIG. 1 shows an embodiment of a method for calibrating and a method for determining a position of an object according to the present invention.
Figure 2:
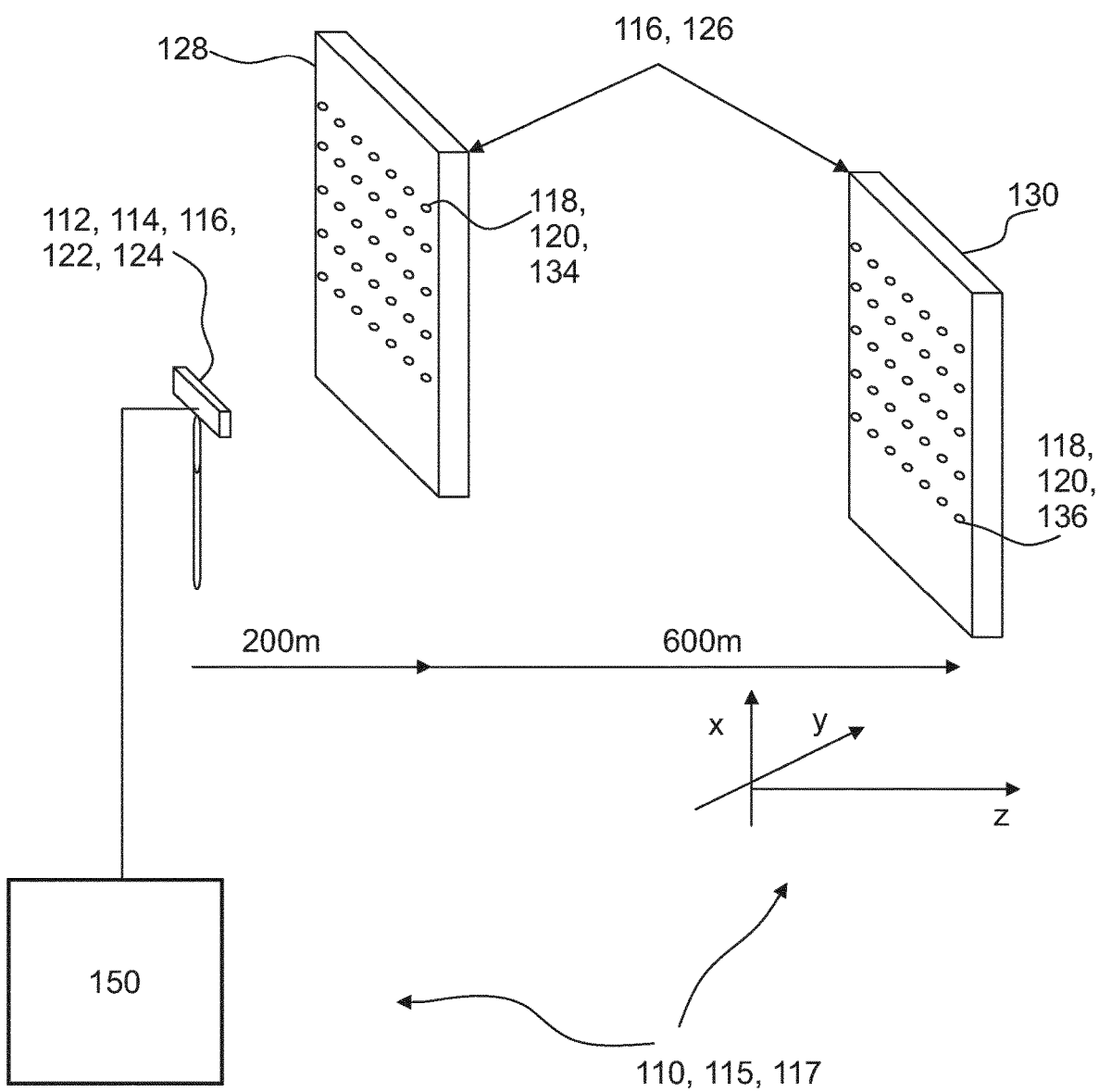
FIG. 2 shows an embodiment of a detector, a kit and a mobile device according to the present invention.

FIG. 1 shows an embodiment of a method for calibrating a detector 110 comprising at least one camera 112 and at least one projector 114 according to the present invention. An embodiment of the detector 110 is shown in FIG. 2. The detector 110 may be part of a mobile device 115. FIG. 2 further shows an embodiment of a kit 117 comprising the detector 110 according to the present invention and a target 126.

The projector 114 is configured for illuminating at least one object 116 with at least one illumination pattern 118 comprising a plurality of illumination features 120. The illumination pattern 118 may be a regular, in particular periodic pattern. The illumination pattern 118 may comprise at least one pattern selected from the group consisting of: at least one quasi random pattern; at least one Sobol pattern; at least one quasiperiodic pattern; at least one point pattern, in particular a pseudo-random point pattern or a random point pattern; at least one line pattern; at least one stripe pattern; at least one checkerboard pattern; at least one triangular pattern; at least one rectangular pattern; at least one hexagonal pattern or a pattern comprising further convex tilings. The illumination pattern 118 may comprise at least one pattern selected from the group consisting of: at least one quasi random pattern; at least one Sobol pattern; at least one quasiperiodic pattern; at least one point pattern, in particular a pseudo-random point pattern; at least one line pattern; at least one stripe pattern; at least one checkerboard pattern; at least one triangular pattern; at least one rectangular pattern; at least one hexagonal pattern or a pattern comprising further convex tilings. The illumination pattern 118 may exhibit the at least one illumination feature 120 selected from the group consisting of: at least one point; at least one line; at least two lines such as parallel or crossing lines; at least one point and one line; at least one arrangement of periodic features; at least one arbitrary shaped featured pattern. For example, the illumination pattern 118 comprises at least one pattern comprising at least one pre-known feature. For example, the illumination pattern 118 comprises at least one line pattern comprising at least one line. For example, the illumination pattern 118 comprises at least one line pattern comprising at least two lines such as parallel or crossing lines. For example, the projector 114 may be configured for generate and/or to project a cloud of points or non-point-like features. For example, the projector 114 may be configured for generate a cloud of points or non-point-like features such that the illumination pattern 118 may comprise a plurality of point features or nonpoint-like features.

The projector 114 may comprise at least one emitter 122 and/or at least one array of emitters 122. Each of the emitters 122 may be configured for emitting at least one light beam. Each of the emitters 122 may be and/or may comprise at least one element selected from the group consisting of at least one laser source such as at least one semi-conductor laser, at least one double heterostructure laser, at least one external cavity laser, at least one separate confinement heterostructure laser, at least one quantum cascade laser, at least one distributed Bragg reflector laser, at least one polariton laser, at least one hybrid silicon laser, at least one extended cavity diode laser, at least one quantum dot laser, at least one volume Bragg grating laser, at least one Indium Arsenide laser, at least one Gallium Arsenide laser, at least one transistor laser, at least one diode pumped laser, at least one distributed feedback lasers, at least one quantum well laser, at least one interband cascade laser, at least one semiconductor ring laser, at least one vertical cavity surface-emitting laser (VCSEL); at least one non-laser light source such as at least one LED or at least one light bulb. The array of emitters 122 may be a two-dimensional or one dimensional array. The array may comprise a plurality of emitters 122 arranged in a matrix.

For example, the emitters 122 may be an array of VCSELs. Examples for VCSELs can be found e.g. in en.wikipedia.org/wikiNertical-cavity_surface-emitting_laser. VCSELs are generally known to the skilled person such as from WO 2017/222618 A. Each of the VCSELs is configured for generating at least one light beam. The VCSELs may be arranged on a common substrate or on different substrates. The array may comprise up to 2500 VCSELs. For example, the array may comprise 38×25 VCSELs, such as a high power array with 3.5 W. For example, the array may comprise 10×27 VCSELs with 2.5 W. For example, the array may comprise 96 VCSELs with 0.9 W. A size of the array, e.g. of 2500 elements, may be up to 2 mm×2 mm.

The light beam emitted by the respective emitter 122 may have a wavelength of 300 to 1100 nm, preferably 500 to 1100 nm. For example, the light beam may have a wavelength of 940 nm. For example, light in the infrared spectral range may be used, such as in the range of 780 nm to 3.0 µm. Specifically, the light in the part of the near infrared region where silicon photodiodes are applicable specifically in the range of 700 nm to 1100 nm may be used. The emitters 122 may be configured for generating the at least one illumination pattern in the infrared region, in particular in the near infrared region. Using light in the near infrared region may allows that light is not or only weakly detected by human eyes and is still detectable by silicon sensors, in particular standard silicon sensors. For example, the emitters 122 may be an array of VCSELs. The VCSELs may be configured for emitting light beams at a wavelength range from 800 to 1000 nm. For example, the VCSELs may be configured for emitting light beams at 808 nm, 850 nm, 940 nm, or 980 nm. Preferably the VCSELs emit light at 940 nm, since terrestrial sun radiation has a local minimum in irradiance at this wavelength, e.g. as described in CIE 085-1989 "Solar spectral Irradiance".

The camera 112 has at least one sensor element 124 having a matrix of optical sensors. The optical sensors each having a light-sensitive area. Each optical sensor is designed to generate at least one sensor signal in response to an illumination of its respective light-sensitive area by a light beam propagating from the object to the camera 112. As an example, the camera 112 may comprise at least one camera chip, such as at least one CCD chip and/or at least one CMOS chip configured for recording images.

Specifically, the optical sensors may be or may comprise inorganic photodiodes which are sensitive in the infrared spectral range, preferably in the range of 780 nm to 3.0 micrometers. Specifically, the optical sensors may be sensitive in the part of the near infrared region where silicon photodiodes are applicable specifically in the range of 700 nm to 1000 nm. Infrared optical sensors which may be used for optical sensors may be commercially available infrared optical sensors, such as infrared optical sensors commercially available under the brand name Hertzstueck™ from trinamiX GmbH, D-67056 Ludwigshafen am Rhein, Germany. Thus, as an example, the optical sensors may comprise at least one optical sensor of an intrinsic photovoltaic type, more preferably at least one semiconductor photodiode selected from the group consisting of: a Ge photodiode, an InGaAs photodiode, an extended InGaAs photodiode, an InAs photodiode, an InSb photodiode, a HgCdTe photodiode. Additionally or alternatively, the optical sensors may comprise at least one optical sensor of an extrinsic photovoltaic type, more preferably at least one semiconductor photodiode selected from the group consisting of: a Ge:Au photodiode, a Ge:Hg photodiode, a Ge:Cu photodiode, a Ge:Zn photodiode, a Si:Ga photodiode, a Si:As photodiode. Additionally or alternatively, the optical sensors may comprise at least one bolometer, preferably a bolometer selected from the group consisting of a VO bolometer and an amorphous Si bolometer.

The optical sensors may be sensitive in one or more of the ultraviolet, the visible or the infrared spectral range. Specifically, the optical sensors may be sensitive in the visible spectral range from 500 nm to 780 nm, most preferably at 650 nm to 750 nm or at 690 nm to 700 nm. Specifically, the optical sensors may be sensitive in the near infrared region. Specifically, the optical sensors may be sensitive in the part of the near infrared region where silicon photodiodes are applicable specifically in the range of 700 nm to 1000 nm. The optical sensors, specifically, may be sensitive in the infrared spectral range, specifically in the range of 780 nm to 3.0 micrometers. For example, the optical sensors each, independently, may be or may comprise at least one element selected from the group consisting of a photodiode, a photocell, a photoconductor, a phototransistor or any combination thereof. For example, the optical sensors may be or may comprise at least one element selected from the group consisting of a CCD sensor element, a CMOS sensor element, a photodiode, a photocell, a photoconductor, a phototransistor or any combination thereof. Any other type of photosensitive element may be used. The photosensitive element generally may fully or partially be made of inorganic materials and/or may fully or partially be made of organic materials. Most commonly, one or more photodiodes may be used, such as commercially available photodiodes, e.g. inorganic semiconductor photodiodes.

The object 116 may be an arbitrary object, in particular a surface or region, which is configured for reflecting and/or scattering at least partially at least one light beam impinging on the object 116. The light beam may originate from a projector illuminating the object, wherein the light beam is reflected and/or scattered by the object 116. The object 116 used for the method for calibrating a detector according to the present invention is a target 126. The target 126 is positioned at a pre-defined distance from the detector. The predefined distance may be a relative distance between the target 126 and the detector 110. Specifically, the predefined distance may be a longitudinal coordinate. The method may comprise manually or automatically positioning the target 126 to the predefined distance, e.g. by using at least one z-stage. The method may comprise at least one positioning step comprising positioning of the target 126 at the predefined distance.

The target 126 comprises at least one first target 128 and at least one second target 130. For example, the target 126 may comprise two target screens. For example, the target screens may be non-transparent screens. The projector 114 and the camera 112 may be arranged on the same side of the target screens.

The method steps may be performed in the given order or may be performed in a different order. Further, one or more additional method steps may be present which are not listed. Further, one, more than one or even all of the method steps may be performed repeatedly.

The method comprises the following steps:

a) (denoted with reference number 132) illuminating the first target 128 with a first part 134 of the illumination pattern 118 and illuminating the second target 130 with a second part 136 of the illumination pattern 118 by using the projector 114, wherein the first part 134 and second part 136 of the illumination pattern 118 differ, and imaging by using the camera 112 at least one combined reflection image 138 of the illuminated first target 128 and the illuminated second target 130, wherein the combined reflection image 138 comprises a plurality of first reflection features 140 generated by the first target 128 in response to the first part 134 of the illumination pattern 118 and a plurality of second reflection features 142 generated by the second target 130 in response to the second part 136 of the illumination pattern 118;

b) (denoted with reference number 144) splitting the combined reflection image 138 into a first reflection image 146 and a second reflection image 148 by using at least one evaluation device 150 of the detector 110, wherein the first reflection image 146 comprises the first reflection features 152 and the second reflection image 148 comprises the second reflection features 154;

c) (denoted with reference number 156) for the first reflection image 146, reconstructing by using the evaluation device 150 missing reflection features 158 relating to the second part 136 of the illumination pattern 118 using the predefined illumination pattern 118, and, for the second reflection image 148, reconstructing by using the evaluation device 150 missing reflection features 160 relating to the first part 134 of the illumination pattern 118 using the predefined illumination pattern 118;

d) (denoted with reference number 162) determining by using the evaluation device 150 a first reconstructed image 164 by adding the reconstructed reflection features 166 relating to the second part 136 of the illumination pattern 118 to the first reflection image 146 and determining by using the evaluation device 150 a second reconstructed image 168 by adding the reconstructed reflection features 170 relating to the first part 134 of the illumination pattern 118 to the second reflection image 148;

e) (denoted with reference number 172) evaluating the first reconstructed image 164 and the second reconstructed image 168 by using the evaluation device 150, wherein the evaluation comprises e1) matching reflection features of the first reconstructed image 164 to reflection features of the second reconstructed image 168 considering the predefined distance of the target 126 and the predefined fixed relative distance of the first target 128 and the second target 130 thereby determining pairs of matched reflection features;

e2) determining an epipolar line for each of the pairs of the matched reflection features, wherein the respective matched reflection features lie on the epipolar line;

f) (denoted with reference number 174) determining at least one extrinsic calibration information of the detector 110 using the determined epipolar lines by using the evaluation device 150.

The first target 128 and the second target 130 have a predefined fixed relative distance. The predefined fixed relative distance may be a relative position between the first target 128 and the second target 130 which is unchanged and/or invariable at least during imaging of the combined reflection image 138. The first target 128 and the second target 130 have fixed relative x, y and z coordinates in space. The target 126 may comprise a distinct step. The target 126 may comprise at least one mechanical element and/or at least one mechanical structure configured for holding the first target 128 and the second target 130 at the predefined fixed relative distance. The mechanical element and/or at least one mechanical structure may comprise at least one optical bench and/or at least one optical rail. The mechanical element and/or the mechanical structure may be configured for allowing to set and/or adapt the relative distance between the first target and the second target, however, before and/or after the illuminating and imaging only. Alternatively, the mechanical element and/or the mechanical structure may be configured for permanently fixing the relative distance between the first target 128 and the second target 130. The first target 128 and the second target 130 may form a static structure. For example, and as shown in FIG. 2, the first target 128 and the second target 130 may be two target screens positioned at different longitudinal coordinates (z), in particular one behind the other. At least one of the transversal coordinates (x and/or y) may be different, too, such that simultaneous illumination and imaging of the first target 128 and the second target 130 is possible.

The first target 128 may be arranged on a front of a measuring range of the detector 110 and the second target 130 may be arranged on a back of the measuring range of the detector 110. Specifically, the surfaces of the first target 128 and the second target 130 are positioned on the front and the back of the measuring range. The first target 128 may be a front target and the second target 130 may be a rear target. For example, the fixed relative distance may be 600 mm. For example, the first target 128 may be positioned at a distance of 200 mm from the detector 110 and the second target 130 may be positioned at a distance of 800 mm from the detector 110.

The first part 134 of the illumination pattern 118 and the second part 136 of the illumination pattern 118 may be halves of the illumination pattern 118. Half of the illumination features 120 of the illumination pattern 118 may be projected on the first target 128 and the other half may be projected on the second target 128.

Figure 3A:
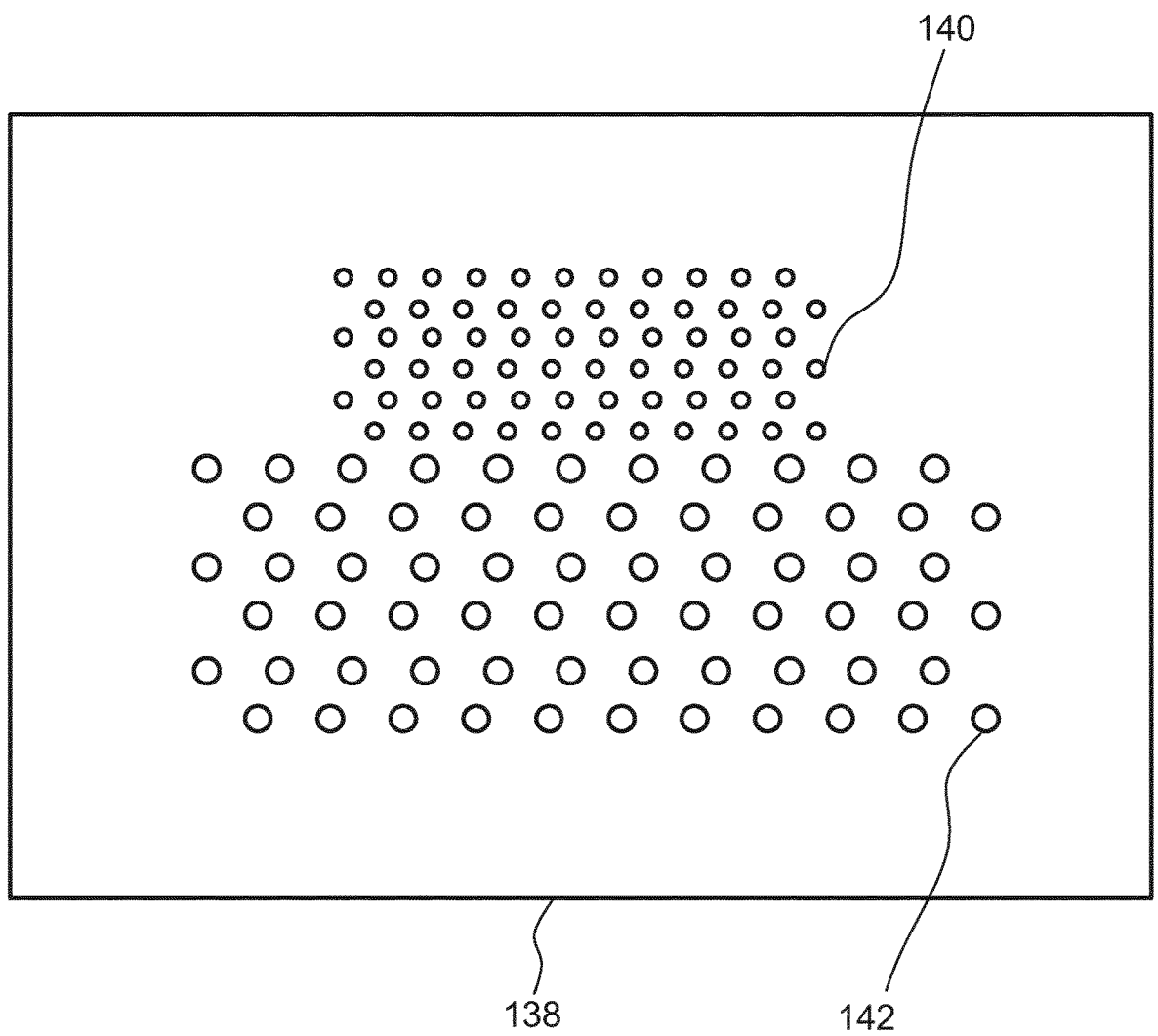
FIGS. 3A to 3C show an embodiment of a combined reflection image, a first reconstructed image and a second reconstructed image.

The combined reflection image 138 may be an image comprising both of a reflection image of the illuminated first target 128 and a reflection image of the illuminated second target 130. Specifically, the combined reflection image 138 is one single image imaged by one single shot of the camera 112. Only one image may be taken with half of the illumination features 120 projected on the first target 128, the other half on the second target 130. An embodiment of a combined reflection image 138 is show in FIG. 3A.

Each of the reflection features comprises at least one beam profile. The beam profile may be a transverse intensity profile of the light beam. The beam profile may be a cross section of the light beam. The beam profile may be selected from the group consisting of a trapezoid beam profile; a triangle beam profile; a conical beam profile and a linear combination of Gaussian beam profiles. Other embodiments are feasible, however.

The splitting in step b) 144 of the combined reflection image 138 may comprise dividing the combined reflection image 138 into two image regions. The method may comprise determining an edge within the combined reflection image 138 by using the evaluation device 150. The combined reflection image 138 may be split into the two reflection images at the position of the edge.

As outlined above, by construction, the first reflection image 146 may comprise only reflection features generated by the first part 134 of the illumination pattern 118 and the second reflection image 148 may comprise only reflection features generated by the second part 136 of the illumination pattern 118. Thus, in the first reflection image 146, the reflection features that would have been generated by the second part 136 of the illumination pattern 118 are missing and in the second reflection image 148 the reflection features that would have been generated by the first part 134 of the illumination pattern 118 are missing.

In step c) 156, for the first reflection image 146 and second reflection image 148 the respectively missing reflection features are reconstructed using the predefined illumination pattern 118. The predefined illumination pattern 118, also denoted as nominal grid, as outlined above, may be a periodically and regular pattern having predefined positions of the illumination features 120 and predefined distances between the illumination features 120. The evaluation device 150 may be configured for determining the reflection features missing in the first reflection image 146 and in the second reflection image 148 using the nominal grid 118. For example, the evaluation device 150 may be configured for comparing the reflection features of the first reflection image 146 with the nominal grid 118 and the reflection features of the second reflection image 148 with the nominal grid 118 for determining the missing reflection features. However, embodiments are feasible in which the evaluation device 150 simply assumes that the reflection features of the other part of the illumination pattern 118 are missing and proceeds with reconstructing the assumed missing reflection features.

The reconstructing may comprise determining a position of a reflection feature in the reflection image. For the reconstruction, the nominal grid 118 may be used. The reconstruction may comprise adapting the position of the illumination features 120 within the nominal grid 118 to an assumed position within the respective reflection image 146, 148. The evaluation device 150 may be configured for determining the regularity and/or periodicity of a first reflection pattern comprising the first reflection features of the first reflection image 146. The evaluation device 150 may be configured for determining a second reflection pattern comprising the second reflection features of the second reflection image 148. The evaluation device 150 may be configured for reconstructing, for the first reflection image 146, the missing reflection features 158 relating to the second part 136 of the illumination pattern 118 by adapting the position of the illumination features 120 of the second part 136 of the illumination pattern 118 considering the determined the regularity and/or periodicity of the first reflection pattern. The evaluation device 150 may be configured for reconstructing, for the second reflection image 148, the missing reflection features 160 relating to the first part 134 of the illumination pattern 118 by adapting the position of the illumination features 118 of the first part 134 of the illumination pattern 118 considering the determined the regularity and/or periodicity of the second reflection pattern. With the help of the nominal grid 118, the missing part of the reflection pattern can be reconstructed on both halves.

Figure 3B:
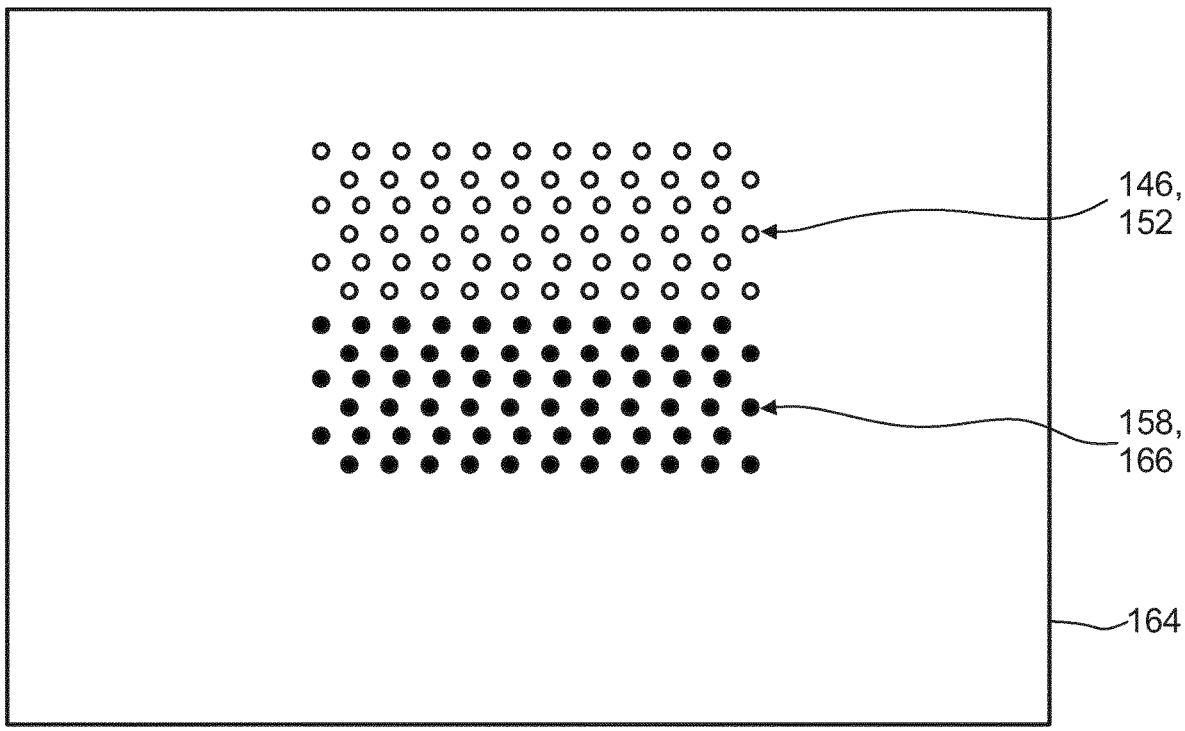
Figure 3C:
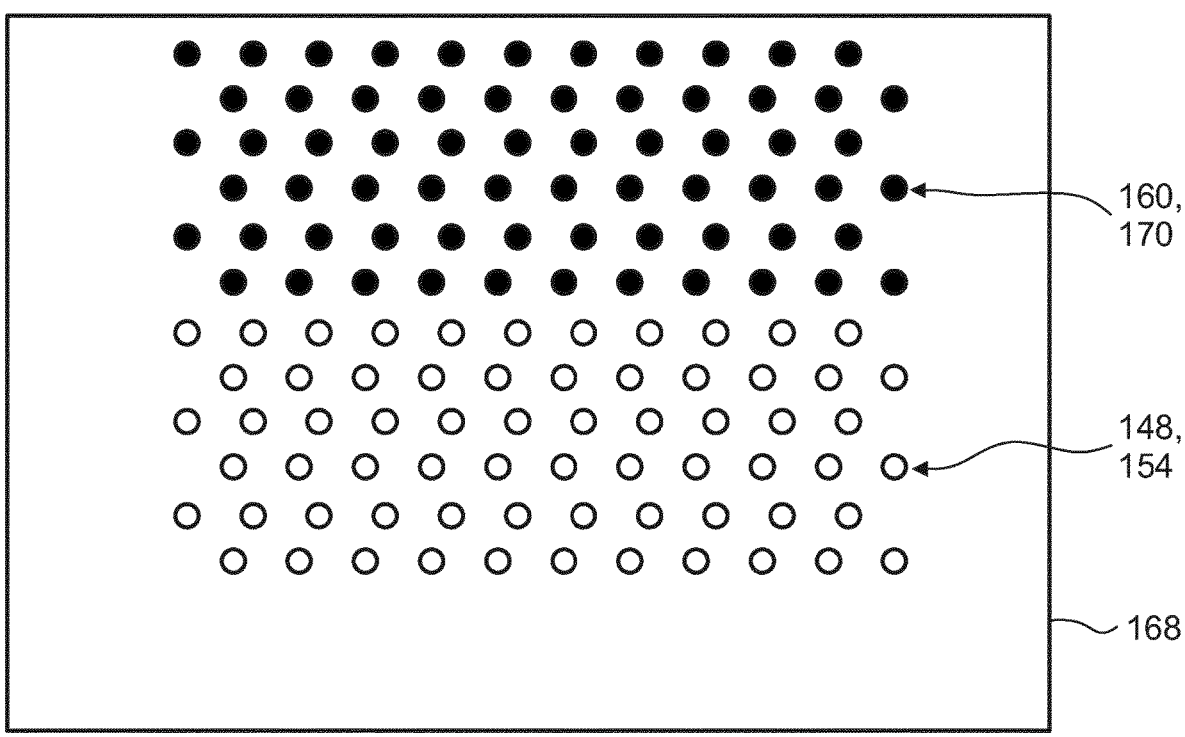

Step d) 162 comprises determining the first reconstructed image 164 by adding the reconstructed reflection features 166 relating to the second part 136 of the illumination pattern 118 to the first reflection image 146 and determining the second reconstructed image 168 by adding the reconstructed reflection features 170 relating to the first part 134 of the illumination pattern 118 to the second reflection image 148. Thus, the first reconstructed image 164 and the second reconstructed image 168 may comprise on one half of the image imaged reflection features and on another half of the image reconstructed reflection features. Embodiments of the first reconstructed image 164 and the second reconstructed image 168 are shown in FIGS. 3B and 3C. These two reconstructed images 164, 168 are used for calibration.

Step e) 172 comprises evaluating the first reconstructed image 164 and the second reconstructed image 168.

The method may comprise identifying the reflection features in the first reconstructed image 164 and the second reconstructed image 168 by using at least one image analysis and/or image processing algorithm. The evaluation device 150 may be configured for selecting reflection features of the respective first reconstructed image 164 and second reconstructed image 168. The evaluation device 150 may be configured for performing at least one image analysis and/or image processing in order to identify the reflection features. The image analysis and/or image processing may use at least one feature detection algorithm. The image analysis and/or image processing may comprise one or more of the following: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue; saturation; and brightness channels; a frequency decomposition; a singular value decomposition; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; creating a binary image. The region of interest may be determined manually by a user or may be determined automatically, such as by recognizing an object within an image.

The evaluation device 150 may be configured for performing at least one image correction. The image correction may comprise at least one background subtraction. The evaluation device 150 may be adapted to remove influences from background light from the beam profile, for example, by an imaging without further illumination.

The evaluation device 150 may be configured for matching the reflection features of the first reconstructed image 164 and the second reconstructed image 168 considering the predefined distance of the target 126 and the predefined fixed relative distance of the first target 128 and the second target 130. The evaluation device 150 may be configured for unambiguously matching the reflection features considering the predefined distance of the target 126 and the predefined fixed relative distance of the first target 128 and the second target 130. The matching may comprise identifying and/or determining and/or evaluating the corresponding reflection features of the first and second reconstructed images 164, 168. As the predefined distances are known, no correspondence problem needs to be solved. Thus, the method may comprise numbering each of the reflection features of the first reconstructed image 164 and the second reconstructed image 168 and matching the corresponding numbers. After step e1), pairs of matched reflection features are known, including their pixel coordinates and their respective predefined distances.

The method further comprises in step e2) determining an epipolar line for each of the pairs of the matched reflection features. The epipolar line for each of the pairs of the matched reflection features is defined by the fact that the respective matched reflection features lie on the same epipolar line. The evaluation device 150 may be configured for determining the epipolar line using the pixel coordinates and predefined distances of the matched the reflection features. For description of epipolar geometry reference is made, for example, to chapter 2 in X. Jiang, H. Bunke: "Dreidimensionales Computersehen" Springer, Berlin Heidelberg, 1997.

Step f) comprises determining an extrinsic calibration information of the detector 110, in particular of the camera 112 and the projector 114, using the determined epipolar lines by using the evaluation device 150. The method may comprise calculating according to the epipolarline geometry the extrinsic calibration information. The method may comprise determining the extrinsic calibration information by evaluating one or more of tilt, shift, distortion of the epipolar lines. For example, the extrinsic calibration information is at least one information selected from the group consisting of: rotation angles between the projector 114 and the camera 112, translation components between the projector 114 and the camera 112, aperture angles, center of the sensor element 124, apertures, focal distance. For example, a translation in z, in particular a z-offset between projector 114 and camera 112, may lead to tilted epipolar lines. For example, a rotation around the x-axis may lead to a shifted pattern of epipolar lines and trapezoidal distortion.

The method may comprise comparing the extrinsic calibration information to at least one predefined nominal value by using the evaluation device 150 thereby determining a correction for an alignment of the projector 114 and the camera 112. For example, the predefined nominal value may be at least one predefined nominal value selected from the group consisting of rotation angles between the projector 114 and the camera 112, translation components between the projector 114 and the camera 112, aperture angles, center of the sensor element 124, apertures, focal distance. For example, the predefined nominal value may be a nominal distance value of a translation between the projector 114 and the camera 112. For example, the nominal value for rotation may be 0° such that the projector 114 and the camera 112 are considered to be positioned in the same plane. The comparing may comprise using at least one mathematical operation for comparing the extrinsic calibration information and the predefined nominal values.

The method may comprise correcting the alignment of the projector 114 and the camera 112 in case the extrinsic calibration information exceeds the predefined nominal value by more than at least one predefined tolerance range. The correcting of the alignment may comprise adapting a relative position of the projector 114 and the camera 112, e.g. during manufacturing of the detector, and/or correcting an imaged reflection image, e.g. during operation of the detector 110. For example, the predefined tolerance range may be ±10% of the nominal value, preferably ±5% of the nominal value, more preferably ±1% of the nominal value. Other embodiments of tolerance ranges, however, are feasible. In case no deviation of the extrinsic calibration information and the respective nominal value within the predefined tolerance range is found, the alignment of the projector 114 and the camera 112 is considered to be "properly". In this case no correction may be required.

The method may comprise at least one verification step, wherein the verifications step comprises repeating steps a) to f) and comparing the extrinsic calibration information to the at least one predefined nominal value for verifying if the correction is successful such that the extrinsic calibration information corresponds to the predefined nominal value at least one within the predefined tolerance range.

FIG. 1 shows further an embodiment of a method 176 for determining a position of at least one object 116 is disclosed. The method comprises calibrating the detector 110 by using the method for calibrating according to the present invention. The method further comprises the following steps:

(178) illuminating at least one object 116 with at least one illumination pattern 118 comprising a plurality of illumination features 120 by using the projector 114 and imaging by using the camera 112 at least one reflection image comprising a plurality of reflection features generated by the object 116 in response to illumination by the illumination features 120 generated, wherein each of the reflection features comprises at least one beam profile;

(180) determining at least one longitudinal coordinate z for each of the reflection features by analysis of its respective beam profile by using at least one evaluation device 150 of the detector 110.

In the context of distance measurement, the object 116 may be an arbitrary object. For example, the object 116 may be a human, in particular a human face.

The analysis of the beam profile may comprise determining at least one first area and at least one second area of the beam profile. The evaluation device 150 may be configured for deriving a combined signal Q by one or more of dividing the first area and the second area, dividing multiples of the first area and the second area, dividing linear combinations of the first area and the second area. The determining of the longitudinal coordinate further may comprise using at least one predetermined relationship between the combined signal Q and a longitudinal coordinate for determining the longitudinal coordinate of the object 116. With respect to determining at least one longitudinal coordinate z reference is made to WO 2018/091649 A1, WO 2018/091638 A1, WO 2018/091640 A1 and C. Lennartz, F. Schick, S. Metz, "Whitepaper-Beam Profile Analysis for 3D imaging and material detection" Apr. 28, 2021, Ludwigshafen, Germany, the full content of which is included by reference.

LIST OF REFERENCE NUMBERS 110 detector
112 camera
114 projector
115 mobile device
116 object
117 kit
118 illumination pattern
120 illumination feature
122 emitter
124 sensor element
126 target 128 first target
130 second target
132 step a
134 first part of the illumination pattern
136 second part of the illumination pattern
138 combined reflection image
140 first reflection features
142 second reflection features
144 Step b
146 first reflection image
148 second reflection image
150 evaluation device
152 first reflection features
154 second reflection features
156 Step c
158 missing reflection features
160 missing reflection features
162 Step d
164 first reconstructed image
166 reconstructed reflection features
168 second reconstructed image
170 reconstructed reflection features
172 Step e
174 Step f
176 Determining a position

The invention claimed is:

1. A method for calibrating a detector comprising at least one camera and at least one projector, wherein the at least one projector is configured for illuminating at least one target with at least one predefined illumination pattern comprising a plurality of illumination features, wherein the camera has at least one sensor element having a matrix of optical sensors, the optical sensors each having a light-sensitive area, wherein each optical sensor is designed to generate at least one sensor signal in response to an illumination of its respective light-sensitive area by a light beam propagating from the target to the camera, wherein the target comprises at least one first target and at least one second target, wherein the first target and the second target have a predefined fixed relative distance, wherein the target is positioned at a pre-defined distance from the detector, wherein the method comprises the following steps:

a) illuminating the first target with a first part of the illumination pattern and illuminating the second target with a second part of the illumination pattern by using the projector, wherein the first and second part of the illumination pattern differ, and imaging by using the camera at least one combined reflection image of the illuminated first target and the illuminated second target, wherein the combined reflection image comprises a plurality of first reflection features generated by the first target in response to the first part of the illumination pattern and a plurality of second reflection features generated by the second target in response to the second part of the illumination pattern;

b) splitting the combined reflection image into a first reflection image and a second reflection image by using at least one evaluation device of the detector, wherein the first reflection image comprises the first reflection features and the second reflection image comprises the second reflection features;

c) for the first reflection image, reconstructing by using the evaluation device missing reflection features relating to the second part of the illumination pattern using the predefined illumination pattern, and, for the second reflection image, reconstructing by using the evaluation device missing reflection features relating to the first part of the illumination pattern using the predefined illumination pattern;

d) determining by using the evaluation device a first reconstructed image by adding the reconstructed reflection features relating to the second part of the illumination pattern to the first reflection image and determining by using the evaluation device a second reconstructed image by adding the reconstructed reflection features relating to the first part of the illumination pattern to the second reflection image;

e) evaluating the first reconstructed image and the second reconstructed image by using the evaluation device, wherein the evaluation comprises e1) matching reflection features of the first reconstructed image to reflection features of the second reconstructed image considering the predefined distance of the target and the predefined fixed relative distance of the first target and the second target thereby determining pairs of matched reflection features; and e2) determining an epipolar line for each of the pairs of the matched reflection features, wherein the respective matched reflection features lie on the epipolar line; and f) determining at least one extrinsic calibration information of the detector using the determined epipolar lines by using the evaluation device.

2. The method according to claim 1, the combined reflection image is one single image imaged by one single shot of the camera.

3. The method according to claim 1, wherein the extrinsic calibration information is at least one information selected from the group consisting of: rotation angles between the projector and the camera, translation components between the projector and the camera, aperture angles, center of the sensor element, apertures, and focal distance.

4. The method according to claim 1, wherein the method comprises determining the extrinsic calibration information by evaluating one or more of tilt, shift, distortion of the epipolar lines.

5. The method according to claim 1, wherein the first target and the second target form a static structure.

6. The method according to claim 1, wherein the first target is arranged on a front of a measuring range of the detector and the second target is arranged on a back of the measuring range of the detector.

7. The method according to claim 1, wherein the first part of the illumination pattern and the second part of the illumination pattern are halves of the illumination pattern, wherein half of the illumination features of the illumination pattern are projected on the first target and the other half is projected on the second target.

8. The method according to claim 1, wherein the method comprises determining an edge within the combined reflection image by using the evaluation device, wherein the combined reflection image is split into the first reflection image and the second reflection image at the position of the edge.

9. The method according to claim 1, wherein the method comprises comparing the extrinsic calibration information to at least one predefined nominal value by using the evaluation device thereby determining a correction for an alignment of the projector and the camera, wherein the method comprises correcting the alignment of the projector and the camera in case the extrinsic calibration information exceeds the predefined nominal value by more than at least one predefined tolerance range.

10. The method according to claim 1, wherein the illumination pattern comprises an arrangement of periodic features.

11. The method according to claim 10, wherein the illumination pattern comprise a triangular pattern, a rectangular pattern, a hexagonal pattern or a pattern comprising further convex tilings.

12. The method according to claim 1, wherein the illumination pattern comprises an arrangement of non-periodic features.

13. The method according to claim 1, wherein the projector projects a light beam having a non-Gaussian beam profile.

14. The method according to claim 1, wherein the projector comprises an array of emitters.

15. The method according to claim 14, wherein the projector comprises a vertical cavity surface-emitting laser (VCSEL).

16. The method according to claim 1, wherein the projector emits light with a wavelength of 780 nm to 3.0 μm.

17. The method according to claim 1, wherein the projector comprises a diffractive optical element (DOE) configured for generating the illumination pattern.

18. The method according to claim 1, wherein the evaluation device is configured for performing an image correction.

19. The method according to claim 1, wherein the evaluation device is configured for determining a longitudinal coordinate for each of the reflection features by analysis of their beam profiles.

20. The method according to claim 1, wherein the evaluation device is further configured to perform the following steps:
  determining a displacement region for the image position of each reflection feature;
  assigning an epipolar line to the displacement region of each reflection feature; and
  assigning and/or determining at least one illumination feature to each reflection feature.

21. The method according to claim 20, wherein:
  assigning an epipolar line to the displacement region of each reflection feature comprises assigning the epipolar line closest to a displacement region and/or within a displacement region and/or closest to a displacement region along a direction orthogonal to the epipolar line; and/or
  assigning and/or determining at least one illumination feature to each reflection feature comprises assigning the illumination feature closest to the assigned displacement region and/or within the assigned displacement region and/or closest to the assigned displacement region along the assigned epipolar line and/or within the assigned displacement region along the assigned epipolar line.

22. A method for determining a position of at least one object, the method comprising calibrating a detector by using the method for calibrating according to claim 1, wherein the method further comprises the following steps:
  illuminating at least one object with at least one illumination pattern comprising a plurality of illumination features by using the projector and imaging by using the camera at least one reflection image comprising a plurality of reflection features generated by the object in response to illumination by the illumination features, wherein each of the reflection features comprises at least one beam profile; and
  determining at least one longitudinal coordinate for each of the reflection features by analysis of its respective beam profile by using at least one evaluation device of the detector.

23. The method according to claim 22, wherein the analysis of the beam profile comprises determining at least one first area and at least one second area of the beam profile, and deriving a combined signal Q by one or more of dividing the first area and the second area, dividing multiples of the first area and the second area, dividing linear combinations of the first area and the second area, wherein the determining of the longitudinal coordinate further comprises using at least one predetermined relationship between the combined signal Q and a longitudinal coordinate for determining the longitudinal coordinate of the object.

24. A detector for determining a position of at least one object, the detector comprising
  at least one projector for illuminating at least one object with at least one illumination pattern comprising a plurality of illumination features;
  at least one camera having at least one sensor element having a matrix of optical sensors, the optical sensors each having a light-sensitive area, wherein each optical sensor is designed to generate at least one sensor signal in response to an illumination of its respective light-sensitive area by a reflection light beam propagating from the object to the camera, wherein the camera is configured for imaging at least one reflection image comprising a plurality of reflection features generated by the object in response to illumination by the illumination features; and
  at least one evaluation device configured for performing the method according to claim 1.

25. A detector for determining a position of at least one object, the detector comprising
  at least one projector for illuminating at least one object with at least one illumination pattern comprising a plurality of illumination features;
  at least one camera having at least one sensor element having a matrix of optical sensors, the optical sensors each having a light-sensitive area, wherein each optical sensor is designed to generate at least one sensor signal in response to an illumination of its respective light-sensitive area by a reflection light beam propagating from the object to the camera, wherein the camera is configured for imaging at least one reflection image comprising a plurality of reflection features generated by the object in response to illumination by the illumination features; and
  at least one evaluation device configured for performing the method according to claim 22.

26. The detector according to claim 25, wherein the detector is integrated into a mobile communication device, a tablet computer, a portable computer.

27. A non-transitory storage medium having program code means for performing the method according to claim 1.

* * * * *